(12) United States Patent  
Choo et al.

(10) Patent No.: US 12,008,970 B2  
(45) Date of Patent: Jun. 11, 2024

(54) DISPLAY DEVICE AND CONTROL METHOD THEREOF

(71) Applicant: Samsung Electronics Co., Ltd., Suwon-si (KR)

(72) Inventors: Hyunjoon Choo, Suwon-si (KR); Hyunsoo Jeong, Suwon-si (KR); Jonghwa Choi, Suwon-si (KR); Jongjin Ko, Suwon-si (KR); Kwangyoun Kim, Suwon-si (KR); Jangwoo Lee, Suwon-si (KR); Kyungah Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 17/727,303

(22) Filed: Apr. 22, 2022

(65) Prior Publication Data

US 2022/0245967 A1 Aug. 4, 2022

Related U.S. Application Data

(63) Continuation of application No. PCT/KR2021/000641, filed on Jan. 18, 2021.

(30) Foreign Application Priority Data

Jan. 21, 2020 (KR) .................. 10-2020-0007753

(51) Int. Cl.
*G09G 3/36* (2006.01)
*G06F 3/01* (2006.01)
(Continued)

(52) U.S. Cl.
CPC ............... *G09G 3/36* (2013.01); *G06F 3/017* (2013.01); *G06F 3/14* (2013.01); *G06V 20/64* (2022.01);
(Continued)

(58) Field of Classification Search
CPC ...... G09G 3/36; H05B 47/125; G06V 40/168; G06V 40/172; G06V 20/64; H04N 23/56; H04N 7/188; G06F 3/017; G06F 3/14
See application file for complete search history.

(56) References Cited

U.S. PATENT DOCUMENTS

| 2011/0019133 A1* | 1/2011 | Ko ..................... G02F 1/133528 349/96 |
| 2015/0138321 A1* | 5/2015 | Yamamoto ........... H04N 23/633 348/222.1 |

(Continued)

FOREIGN PATENT DOCUMENTS

| JP | 4481142 B2 | 6/2010 |
| JP | 2011-150595 A | 8/2011 |

(Continued)

*Primary Examiner* — Thai Q Tran
*Assistant Examiner* — Jose M Mesa
(74) *Attorney, Agent, or Firm* — Jefferson IP Law, LLP

(57) ABSTRACT

A display device is provided. The display device includes a mirror display, a three-dimensional camera positioned toward a front direction of the mirror display, and a controller configured to detect facial contours of a user from three-dimensional face images of the user photographed at at least two different time points by the three-dimensional camera, identify a change of the facial contours between the two time points based on the detected facial contours, and control the mirror display to display information about the change of the facial contours.

20 Claims, 23 Drawing Sheets

(51) Int. Cl.
  *G06F 3/14* (2006.01)
  *G06V 20/64* (2022.01)
  *G06V 40/16* (2022.01)
  *H04N 7/18* (2006.01)
  *H04N 23/56* (2023.01)
  *H05B 47/125* (2020.01)

(52) U.S. Cl.
  CPC .......... *G06V 40/168* (2022.01); *G06V 40/172* (2022.01); *H04N 7/188* (2013.01); *H04N 23/56* (2023.01); *H05B 47/125* (2020.01)

(56) References Cited

U.S. PATENT DOCUMENTS

2017/0265280 A1* 9/2017 Setomoto ............ F21V 23/0478
2019/0191850 A1* 6/2019 Yoganandan ....... B26B 21/4056

FOREIGN PATENT DOCUMENTS

| | | |
|---|---|---|
| JP | 2013-157845 A | 8/2013 |
| KR | 10-0727746 B1 | 6/2007 |
| KR | 10-2013-0037600 A | 4/2013 |
| KR | 10-2014-0075756 A | 6/2014 |
| KR | 10-1494301 B1 | 2/2015 |
| KR | 10-2016-0041965 A | 4/2016 |
| KR | 10-1664940 B1 | 10/2016 |
| KR | 10-2017-0019827 A | 2/2017 |
| KR | 10-1930851 B1 | 12/2018 |
| KR | 10-2019-0068146 A | 6/2019 |
| WO | 2014/156146 A1 | 10/2014 |

* cited by examiner

DISPLAY DEVICE AND CONTROL METHOD THEREOF

CROSS-REFERENCE TO RELATED APPLICATION(S)

This application is a continuation application, claiming priority under § 365(c), of an International application No. PCT/KR2021/000641, filed on Jan. 18, 2021, which is based on and claims the benefit of a Korean patent application number 10-2020-0007753, filed on Jan. 21, 2020, in the Korean Intellectual Property Office, the disclosure of each of which is incorporated by reference herein in its entirety.

BACKGROUND

1. Field

The disclosure relates to a display device capable of performing both a mirror function and a display function, and a control method thereof.

2. Description of Related Art

Lately, a display device into which a mirror and a display are combined is being developed, and the display device is called a smart mirror or a mirror display.

When a half mirror having a specific ratio of transmittance and reflectance is provided in front of a display, a screen displayed on the display when the display is turned on is transmitted through the half mirror to be shown to a user located in front of the display device, and when the display is turned off, visible light is reflected from the half mirror so that the display device functions as a mirror.

Because the display device performs both the function of a mirror and the function of a display, the display device is usable for various purposes in various fields.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a display device including a mirror display to detect a change of a facial contour of a user based on a three-dimensional face image of the user photographed by a three-dimensional camera and provide information about the detected change of the facial contour to the user, and a method of controlling the display device.

Another aspect of the disclosure is to provide a display device including a mirror display to detect a predefined gesture from a three-dimensional image photographed by a three-dimensional camera and activate the display when the predefined gesture is detected, and a method of controlling the display device.

Additional aspects will be set forth in part in the description which follows and, in part, will be apparent from the description, or may be learned by practice of the presented embodiments.

In accordance with an aspect of the disclosure, a display device is provided. The display device includes a mirror display, a three-dimensional camera positioned toward a front direction of the mirror display, and a controller configured to detect facial contours of a user from three-dimensional face images of the user photographed at at least two different time points by the three-dimensional camera, determine a change of the facial contours between the two time points based on the detected facial contours, and control the mirror display to display information about the change of the facial contours.

The controller may control the mirror display to display the information about the change of the facial contours by a numerical value.

The display device may further include a two-dimensional camera positioned toward the front direction of the mirror display, and the controller may control the mirror display to display the information about the change of the facial contours on a two-dimensional face image of the user photographed by the two-dimensional camera.

The controller may store at least one of the three-dimensional face images and the information about the change of the facial contours for each user.

The controller may recognize the user based on the two-dimensional face image of the user photographed by the two-dimensional camera or the three-dimensional face images of the user photographed by the three-dimensional camera.

The controller may determine the change of the facial contours based on a three-dimensional face image stored for the recognized user and a current three-dimensional face image of the user photographed by the three-dimensional camera.

The controller may determine a face shape type of the user based on the detected facial contours, and control the mirror display to provide information about a makeup style corresponding to the determined face shape type of the user.

The controller may control the mirror display to provide information about a makeup style corresponding to the change of the facial contours.

The mirror display may include a half mirror positioned on a front surface of the display device, and a display positioned behind the half mirror.

The mirror display may include a display including an upper polarizing plate on which a mirror film is positioned.

A display device according to another example includes a mirror display, a three-dimensional camera positioned toward a front direction of the mirror display, a motion sensor configured to sense a user's motion, and a controller configured to activate the three-dimensional camera when the motion sensor detects the user's motion, detect a predefined gesture from a three-dimensional image photographed by the three-dimensional camera, and activate the mirror display when the predefined gesture is detected.

The display device may further include a two-dimensional camera positioned toward the front direction of the mirror display, and the controller may activate the two-dimensional camera when the predefined gesture is detected.

The controller may control, when the user's approach is detected from the three-dimensional image photographed by the three-dimensional camera, the mirror display to display an enlarged two-dimensional image.

The controller may detect a user indicating area from a two-dimensional image photographed by the two-dimensional camera or the three-dimensional image photographed by the three-dimensional camera, and control the two-dimensional camera to zoom in the detected user indicating area and photograph the user indicating area.

The controller may detect the user indicating area from the two-dimensional image photographed by the two-dimensional camera or the three-dimensional image photographed by the three-dimensional camera, and control the mirror display to enlarge and display the detected user indicating area from the two-dimensional image photographed by the two-dimensional camera.

The display device may further include a light positioned toward the front direction, and the controller may control brightness of the light based on the three-dimensional image photographed by the three-dimensional camera.

The controller may detect the user's approach based on the three-dimensional image, and, when the user's approach is detected, the controller may control the light to emit brighter light.

The controller may determine a distance between the user and the display device based on the three-dimensional image, and control brightness of the light based on the determined distance.

In accordance with another aspect of the disclosure, a method of controlling a display device, the display device including a mirror display, a two-dimensional camera, and a three-dimensional camera is provided. The method includes photographing a three-dimensional face image of a user at a first time point by using the three-dimensional camera, photographing a three-dimensional face image of the user at a second time point by using the three-dimensional camera, detecting a facial contour of the user from the three-dimensional face image of the user photographed at the first time point, detecting a facial contour of the user from the three-dimensional face image of the user photographed at the second time point, determining a change of the facial contours between the first time point and the second time point based on the detected facial contours, and displaying information about the change of the facial contours on the mirror display.

The displaying of the information about the change of the facial contours on the mirror display may include displaying the information about the change of the facial contours by a numerical value.

The displaying of the information about the change of the facial contours on the mirror display may include displaying the information about the change of the facial contours on the two-dimensional face image of the user photographed by the two-dimensional camera.

The method may further include storing at least one of the three-dimensional face images photographed at the first time point and the second time point and the information about the change of the facial contours for each user.

The method may further include recognizing the user based on the two-dimensional face image of the user photographed by the two-dimensional camera or the three-dimensional face images of the user photographed by the three-dimensional camera.

The determining of the change of the facial contours between the first time point and the second time point may include determining the change of the facial contours based on the three-dimensional face image stored for the recognized user and photographed at the first time point and the three-dimensional face image of the user photographed at the second time point by the three-dimensional camera.

A display device and a control method thereof according to an embodiment may detect a change of a facial contour of a user based on a three-dimensional face image of the user photographed by a three-dimensional camera and provide information about the detected change of the facial contour to the user.

Also, by detecting a predefined gesture from a three-dimensional image photographed by a three-dimensional camera and activating a mirror display when the predefined gesture is detected, the mirror display may be prevented from performing an unnecessary operation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
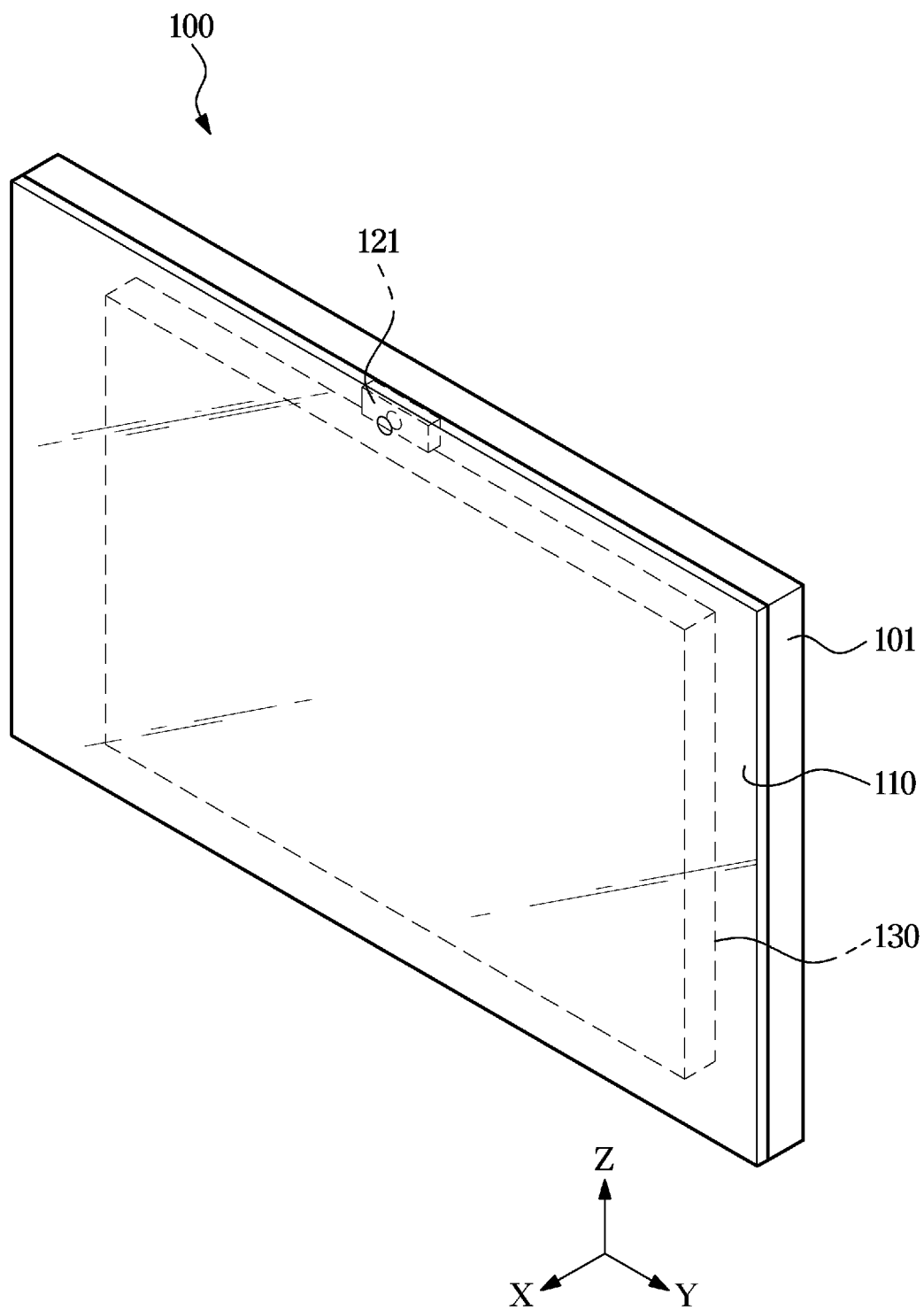
FIG. 1 is a perspective view showing an appearance of a display device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, like reference numerals will refer to like components throughout this specification. This specification does not describe all components of the embodiments, and general information in the technical field to which the disclosure belongs or overlapping information between the embodiments will not be described. As used herein, the terms "portion," "part," "module," "member," or "block" may be implemented as software or hardware, and according to embodiments, a plurality of "portions," "parts," "modules," "members," or "blocks" may be implemented as a single component, or a single "portion," "part," "module," "member," or "block" may include a plurality of components.

It will be understood that when a certain part is referred to as being "connected" to another part, it can be directly or indirectly connected to the other part. When a part is indirectly connected to another part, it may be connected to the other part through a wireless communication network or electrically connected to the other part through an electrical wiring.

Also, it will be understood that when the terms "includes," "comprises," "including," and/or "comprising," when used in this specification, specify the presence of a stated component, but do not preclude the presence or addition of one or more other components.

In the entire specification, it will also be understood that when an element is referred to as being "on" or "over" another element, it can be directly on the other element or intervening elements may also be present.

In the entire specification, it will also be understood that when a certain component transfers or transmits a signal or data to another component, another component can exist between the corresponding component and the other component and transferring or transmitting the signal or data through the other component is not excluded, unless the context clearly dictates otherwise.

In the entire specification, it will also be understood that ordinal numbers such as "first" and "second" are used to distinguish a plurality of components from each other, not to represent an arrangement, a manufacturing order, importance, etc., of the components.

Reference symbols used in operations are used to indicate the individual operations, without describing the order of the operations, and the operations can be executed in a different order from the stated order unless a specific order is definitely specified in the context.

Hereinafter, embodiments of a display device and a control method thereof according to an aspect will be described in detail with reference to the accompanying drawings.

Figure 2:
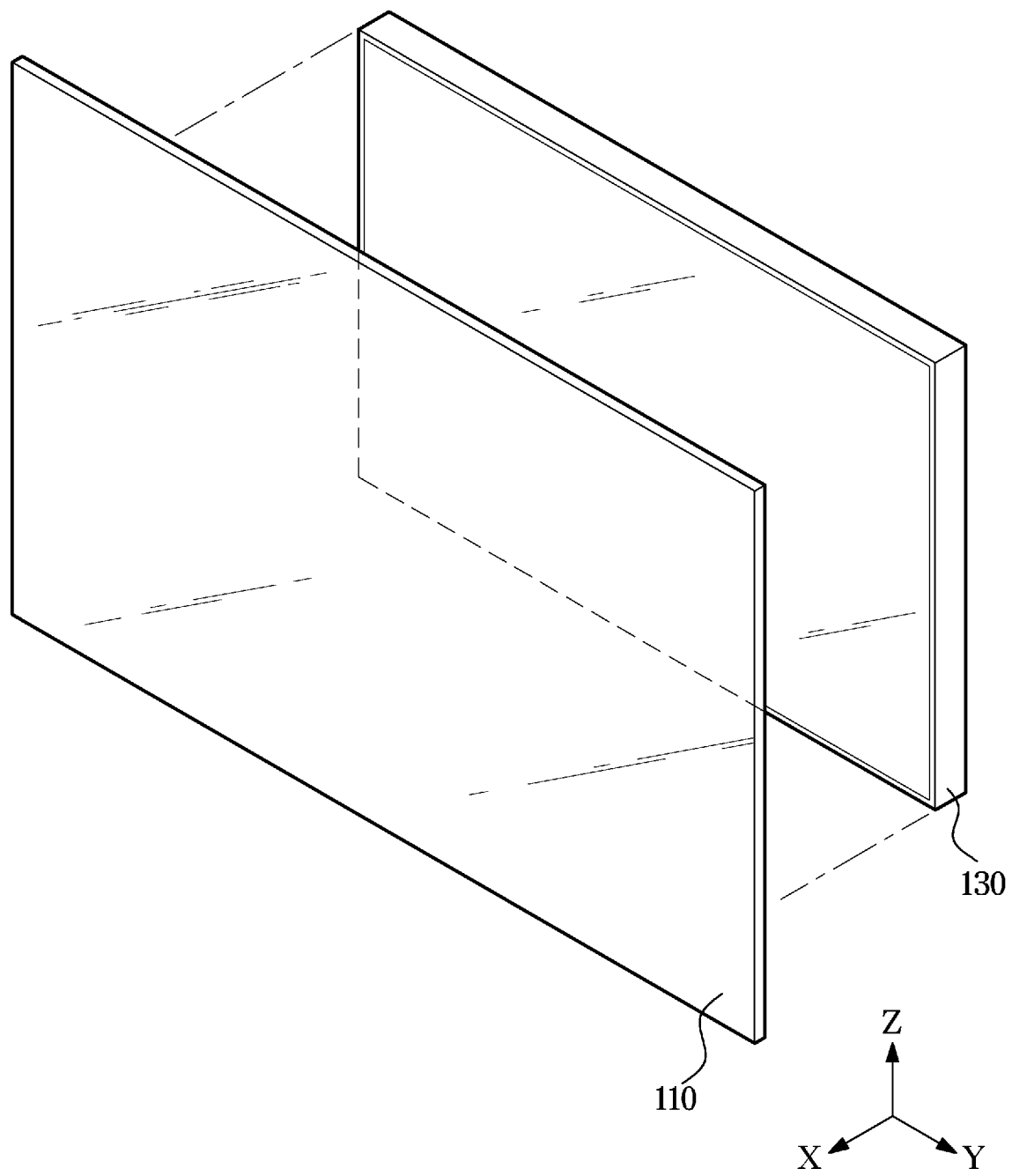
FIG. 2 is an exploded perspective view showing some components of a display device according to an embodiment of the disclosure.

FIG. 1 is a perspective view showing an appearance of a display device according to an embodiment of the disclosure, and FIG. 2 is an exploded perspective view showing some components of a display device according to an embodiment of the disclosure.

A display device 100 according to an embodiment may include a mirror display that performs both a function of a mirror and a function of a display.

Referring to FIGS. 1 and 2, the mirror display may be implemented by various methods, and, a half mirror 110 may be positioned on a front surface of the display device 100 and a display 130 may be positioned behind the half mirror 110. The display 130 may be one of various kinds of displays, such as a liquid crystal display (LCD), an organic light-emitting diode (OLED) display, etc.

A housing 101 may support the half mirror 110, and the display 130 and other components may be installed inside the housing 101.

The half mirror 110 may be a mirror having a specific ratio of transmittance and reflectance. At higher transmittance of the half mirror 110, the display 130 positioned behind the half mirror 110 may have higher visibility, and, at higher reflectance of the half mirror 110, reflectance of visible light being incident in a front direction to the half mirror 110 may be higher so that a clear mirror may be implemented.

The display device 100 according to an embodiment may adopt the half mirror 110 having an appropriate ratio of transmittance and reflectance by considering both a function as a display and a function as a mirror. For example, the half mirror 110 may have reflectance of 65% and transmittance of 35%, or reflectance of 75% and transmittance of 25%.

Figure 3:
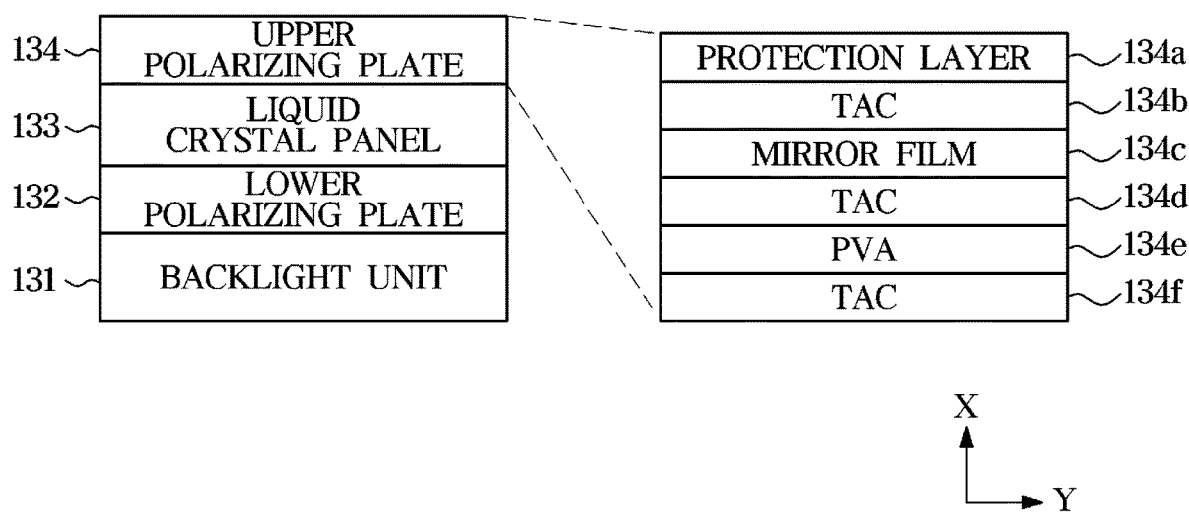
FIG. 3 is a side cross-sectional view of a display device when the display device has a structure of another example according to an embodiment of the disclosure.

FIG. 3 is a side cross-sectional view of a display device when the display device has a structure of another example according to an embodiment of the disclosure.

Referring to FIG. 3, the display 130 may itself be implemented as a mirror type. For example, in the case in which the display 130 is implemented as an LCD, the display 130 may include a backlight unit 131, a lower polarizing plate 132 positioned in front of the backlight unit 131, a liquid crystal panel 133 positioned in front of the lower polarizing plate 132, and an upper polarizing plate 134 positioned in front of the liquid crystal panel 133, as shown in FIG. 3.

A component for implementing the display 130 as a mirror type may correspond to the upper polarizing plate 134. PolyVinylAlcohol (PVA) 134e may be a film for classifying light in a polarizing plate, and Tri-Acetyl-Cellulose (TAC, or cellulose triacetate) 134b, 134d, and 134f may be films for protecting a polarizing plate. A top layer of the upper polarizing plate 134 may be a protection layer 134a.

A mirror film 134c having a specific ratio of transmittance and reflectance may be added to the upper polarizing plate 134, thereby implementing the display 130 as a mirror display.

Alternatively, the display 130 may be implemented as an OLED display. In this case, by adding a mirror film in an upper polarizing plate of the display 130, a mirror display may be implemented.

A method for implementing the mirror display of the display device 100 according to an embodiment is not limited. However, in the following embodiments, for a detailed description, a case in which a mirror display includes the half mirror 110 and the display 130 separately will be described as an example.

Figure 4:
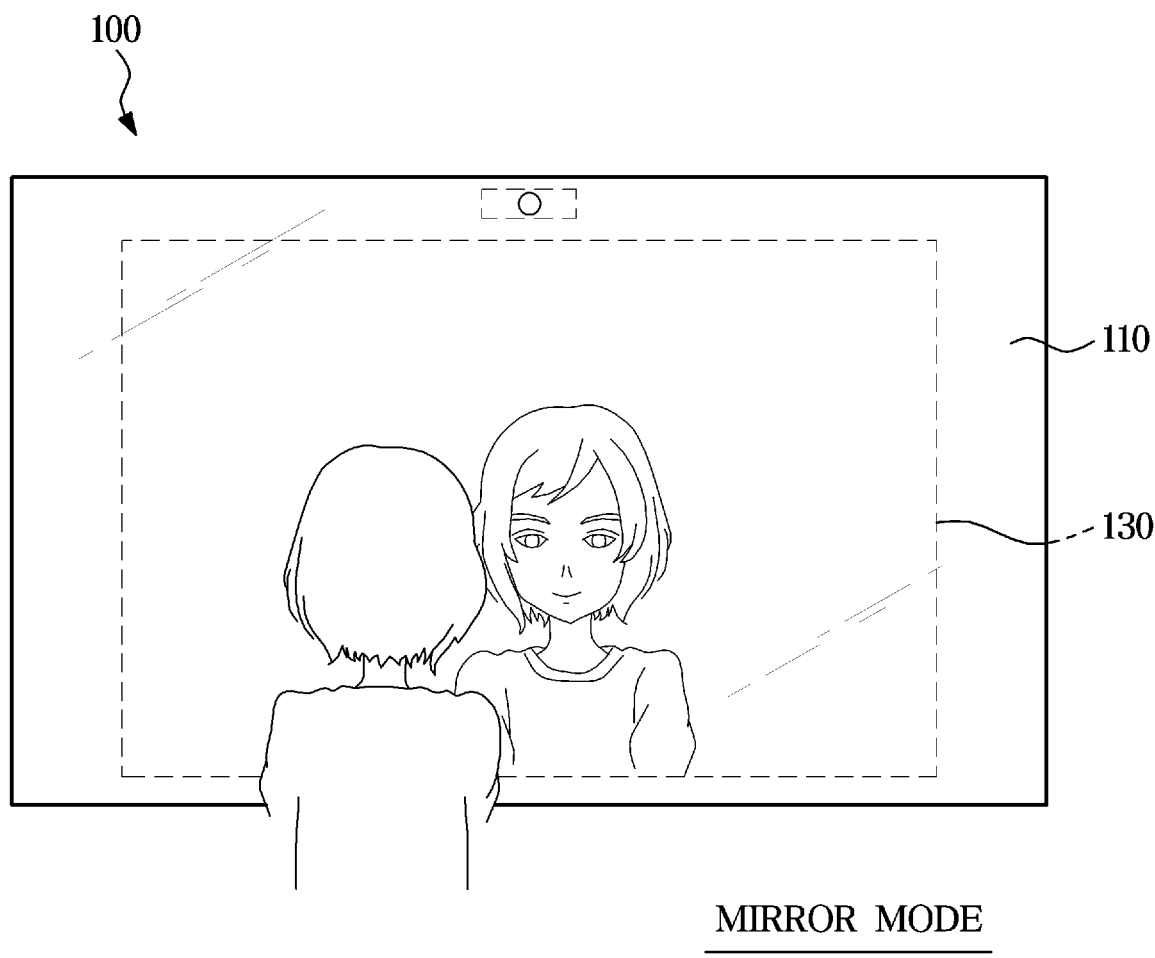
FIG. 4 shows a display device when the display device operates in a mirror mode according to an embodiment of the disclosure.
Figure 5:
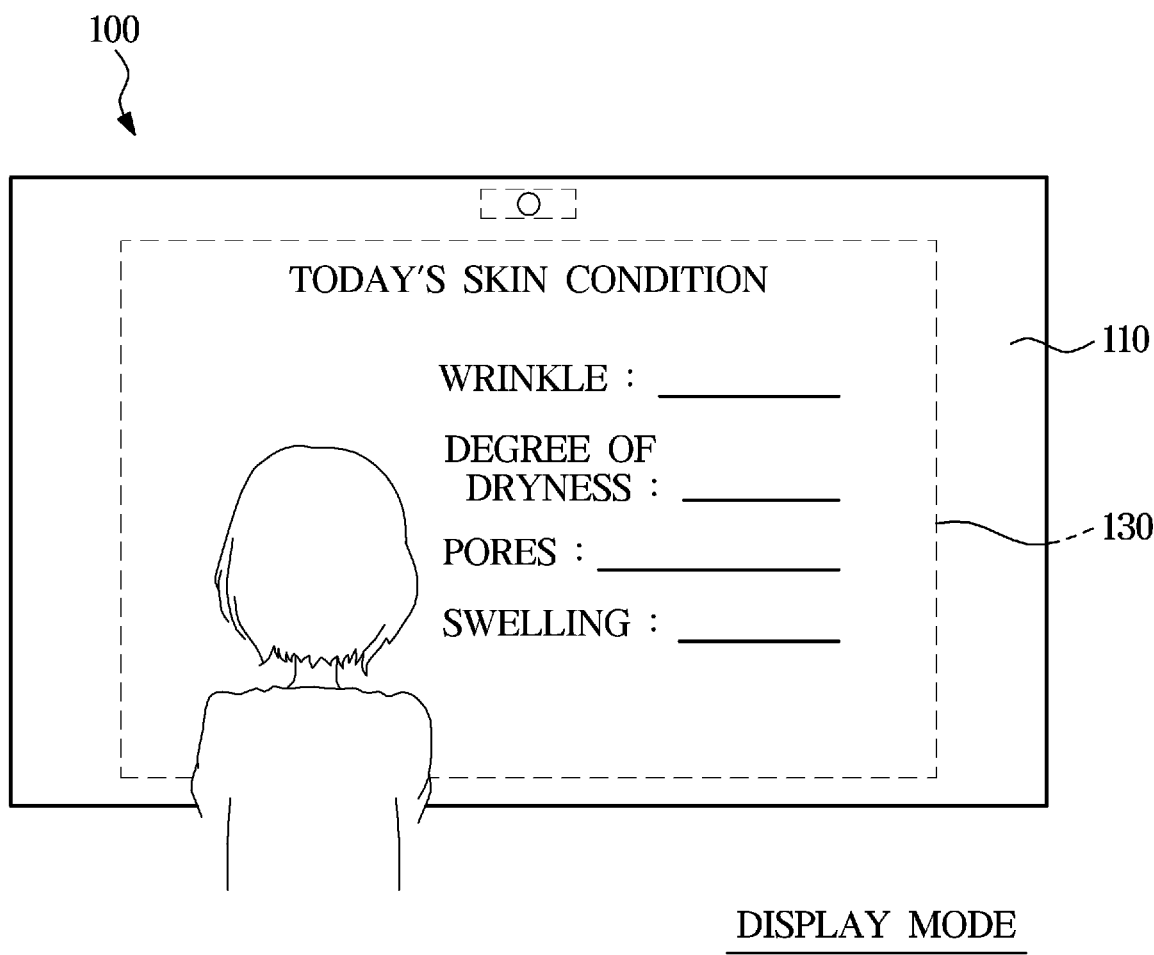
FIG. 5 shows a display device when the display device operates in a display mode according to an embodiment of the disclosure.

FIG. 4 shows a display device when the display device operates in a mirror mode according to an embodiment of the disclosure, and FIG. 5 shows a display device when the display device operates in a display mode according to an embodiment of the disclosure.

Referring to FIG. 4, when the display device 100 operates in the mirror mode, the display 130 may be deactivated, and a user located in front of the display device 100 may check himself/herself reflected on the half mirror 110 by visible light reflected by the half mirror 110. That is, the display device 100 may be used as a mirror.

The deactivated display 130 may be in an off state, or may be in a state that displays no screen although the display 130 is in an on state. When the display 130 displays no screen in an on state, the display 130 may display a black color to thereby prevent deterioration in reflectance of the half mirror 110.

Referring to FIG. 5, when the display device 100 operates in the display mode, the display 130 may be activated. The activated display 130 may be in a state that displays a screen. The screen displayed on the display 130 may be transmitted through the half mirror 110 and shown to a user.

The display device 100 according to an embodiment may be used for a user's beauty management. Accordingly, when the display device 100 operates in the display mode, information about a user's skin condition may be provided, as shown in FIG. 5. Details about information provided by the display device 100 will be described later.

Meanwhile, although not shown in FIG. 5, because the half mirror 110 has a specific ratio of transmittance and reflectance, the half mirror 110 may function as a mirror by reflecting visible light, even when the display device 100 operates in the display mode.

Figure 6:
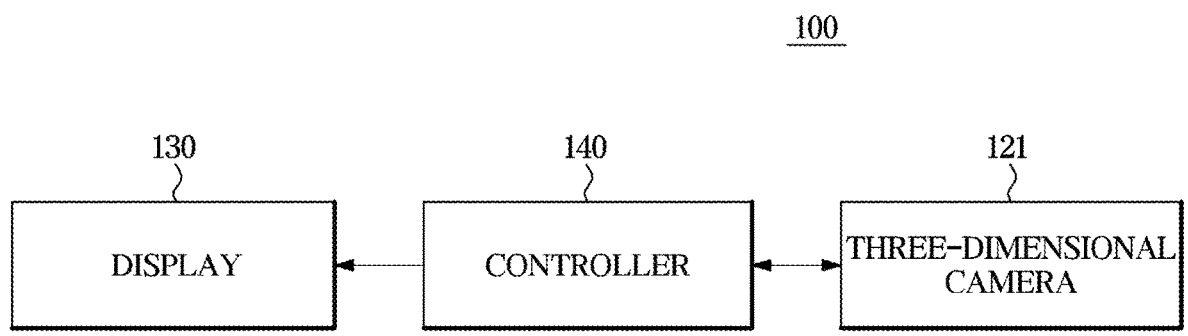
FIG. 6 is a control block diagram of a display device according to an embodiment of the disclosure.
Figure 7:
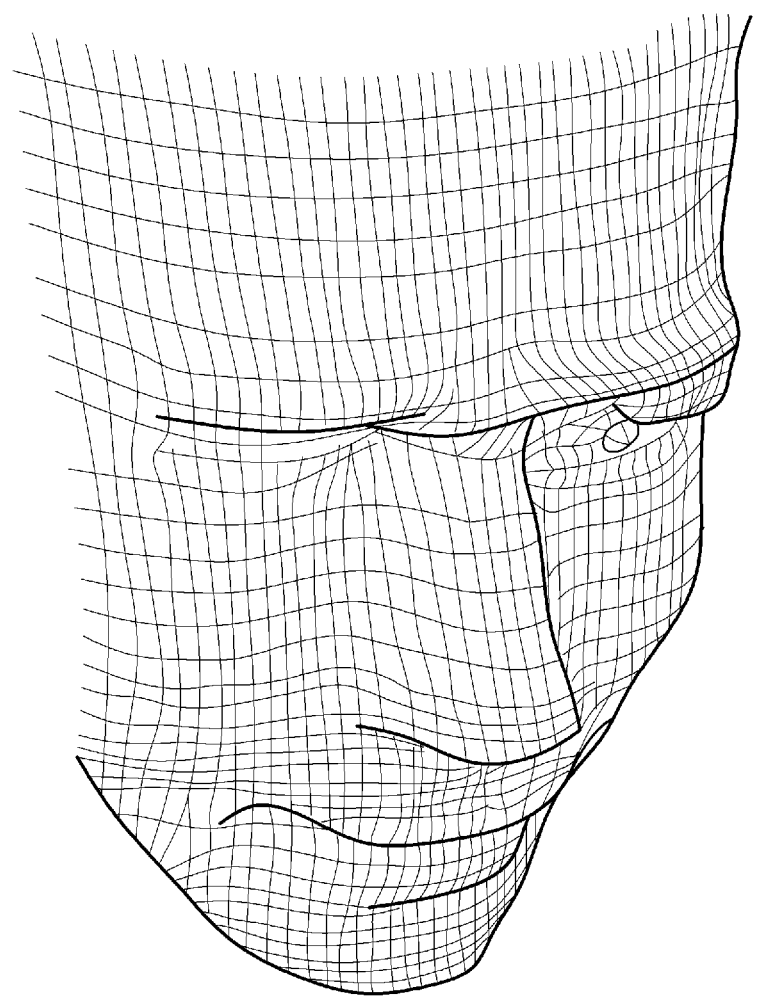
FIG. 7 shows an example of three-dimensional information obtained by a three-dimensional camera of a display device according to an embodiment of the disclosure.

FIG. 6 is a control block diagram of a display device according to an embodiment of the disclosure, and FIG. 7 shows an example of three-dimensional information obtained by a three-dimensional camera of a display device according to an embodiment of the disclosure.

Referring to FIG. 6, the display device 100 according to an embodiment may include a mirror display, a three-dimensional camera 121 positioned toward the front direction, and a controller 140 of detecting facial contours of a user from three-dimensional face images of the user photographed at at least two different time points by the three-dimensional camera 121, determining a change of the facial contours between the two time points based on the detected facial contours, and controlling the mirror display to display information about the change of the facial contours.

The mirror display may be implemented by including the half mirror 110 and the display 130 separately, as shown in FIGS. 1 and 2 described above, or the display 130 may itself be implemented as a mirror type by positioning a mirror film on the polarizing plate of the display 130, as shown in FIG. 3 described above.

In the following embodiment, for a detailed description, the case in which the mirror display includes the half mirror 110 and the display 130 will be described as an example.

Referring together to FIG. 1, the three-dimensional camera 121 may be installed in the display device 100. The three-dimensional camera 121 may be a camera capable of obtaining three-dimensional information about an object, that is, depth information, together with two-dimensional information. A method of obtaining three-dimensional information about an object in the three-dimensional camera 121 may include a Time of Flight (TOF) method, a stereo method, etc. The embodiment of the display device 100 does not limit a method of obtaining three-dimensional information in the three-dimensional camera 121.

The three-dimensional camera 121 may be positioned toward the front direction of the display device 100 to photograph a user located in front of the three-dimensional camera 121 and photograph a three-dimensional face image of the user according to a location of the user.

Referring to FIG. 7, a three-dimensional face image photographed by the three-dimensional camera 121 may include three-dimensional stereoscopic information about a facial contour of a user, unlike a two-dimensional image.

The controller 140 may detect the facial contour of the user from the three-dimensional face image. For example, the controller 140 may detect the facial contour of the user by applying an image processing technique, such as a face recognition algorithm, an edge detection algorithm, etc., to the three-dimensional face image. A method of detecting a facial contour of a user from a three-dimensional face image in the controller 140 is not limited, and any one capable of detecting a facial contour among known image processing algorithms may be applied.

After the three-dimensional camera 121 photographs three-dimensional face images of a user at at least two different time points, the controller 140 may detect a facial contour of the user from a three-dimensional face image of the user photographed at a first time point, and a facial contour of the user from a three-dimensional face image of the user photographed at a second time point.

The first time point and the second time point may be different dates or different times on the same date.

The controller 140 may determine a change of the facial contours based on the detected facial contours. For example, the change of the facial contours may include at least one of a change in volume of the entire face and a change in volume of a specific part. The specific part may include at least one of all parts, such as cheek, cheekbone, chin, under the eyes, eyelids, etc., of which volumes may change due to a cause, such as swelling, a weight change, etc.

Meanwhile, at least one of a three-dimensional face image and information about a change of a facial contour may be stored for each user. For the controller 140 to store and manage at least one of a three-dimensional face image and information about a change of a facial contour for each user, the controller 140 may recognize a user, and user recognition may be performed based on a user input or automatically.

When a user is recognized based on a user input, the user may input information such as his/her identification (ID) or name based on which the user can be identified, to an input device provided in the display device 100, and a three-dimensional face image of the user or information about a change of a facial contour of the user may match with the information based on which the user can be identified and be stored.

When a user is recognized automatically, the controller 140 may recognize the user based on a two-dimensional face image of the user photographed by a two-dimensional camera 122 or a three-dimensional face image of the user photographed by the three-dimensional camera 121. At this time, the controller 140 may apply a face recognition algorithm to the two-dimensional face image or the three-dimensional face image.

After the controller 140 recognizes the user based on the two-dimensional face image of the user or the three-dimensional face image of the user, the controller 140 may search a three-dimensional face image stored for the recognized user, compare a current three-dimensional face image of the user photographed by the three-dimensional camera 121 with the stored three-dimensional face image, and determine a change of a facial contour.

The controller 140 may include at least one memory storing a program for performing the above-described operations and operations which will be described later, and at least one processor for executing the stored program.

When the controller 140 includes a plurality of memories and a plurality of processors, the plurality of memories and the plurality of processors may be integrated into a single chip, or some of the memories and processors, may be physically separated. The embodiment of the display device 100 does not limit physical locations of the memories and processors constituting the controller 140.

The controller 140 may control the display 130 to display information about the change of the facial contour of the user.

Figure 8:
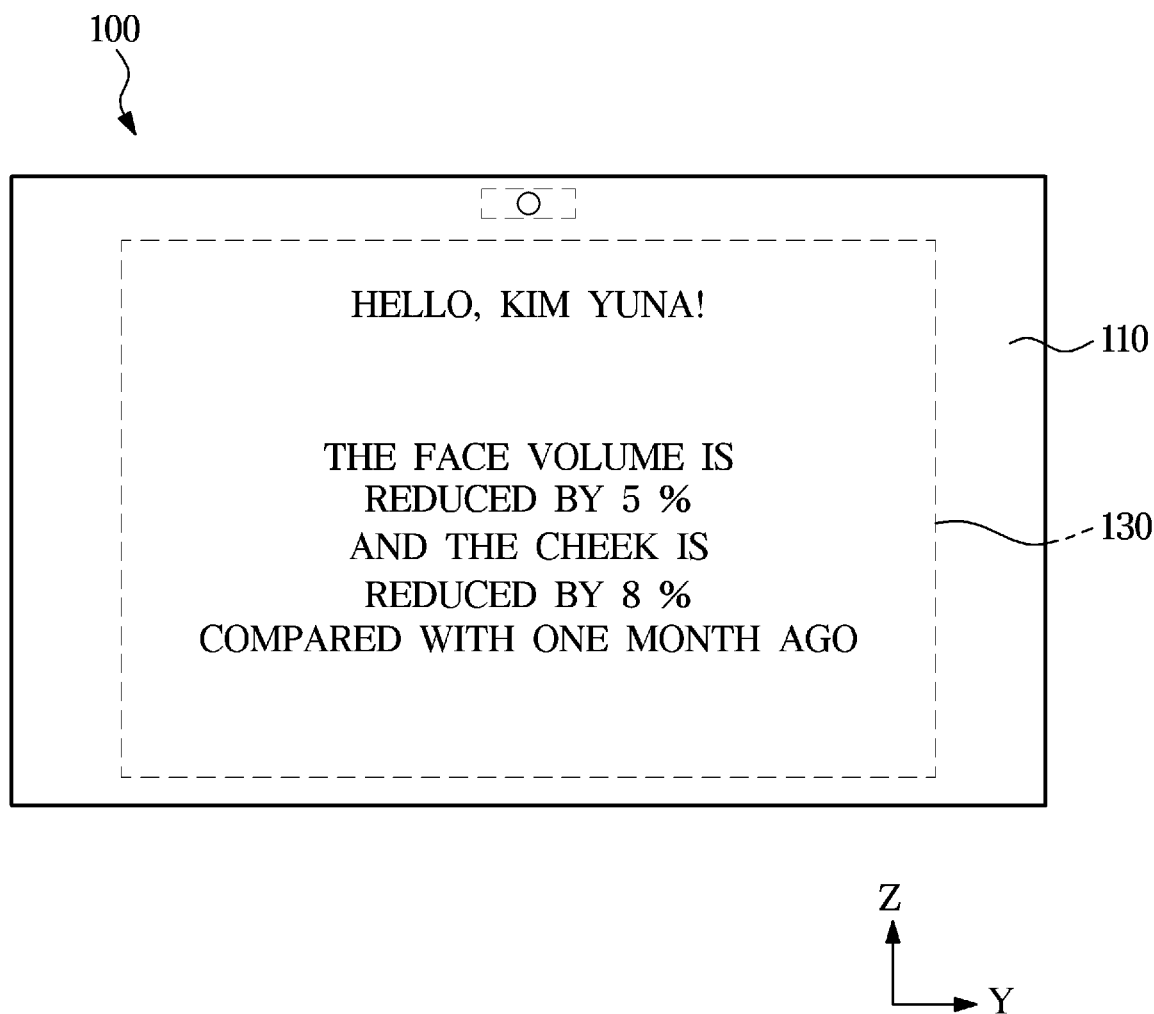
FIG. 8 shows an example of information about a change of a facial contour of a user, displayed on a display device according to an embodiment of the disclosure.

FIG. 8 shows an example of information about a change of a facial contour of a user, displayed on a display device according to an embodiment of the disclosure.

For example, information about a change of a facial contour may be represented by a numerical value, as shown in FIG. 8.

Referring to FIG. 8, a time interval between a first time point and a second time point may be one month. The controller 140 may detect a facial contour from a three-dimensional face image of a user photographed by the three-dimensional camera 121 a month ago, detect a facial contour from a three-dimensional face image of the user currently photographed, compare the facial contour photographed a month ago with the current facial contour, and determine a change of the facial contours for a month.

As a result of the determination, when a face volume is reduced by 5% and the cheek of specific parts is reduced by 8% compared with one month ago, information about a change of facial contours may be represented by numerical values on the display 130, as shown in FIG. 8.

Two time points at which images from which a change of facial contours is determined are photographed may be determined by a predefined period, by a user's selection, or by time points at which three-dimensional face images are photographed.

When a period per which a change of facial contours is determined is set to a month, the controller 140 may compare a three-dimensional face image of a user photographed at a first time point with a three-dimensional face image of the user photographed at a second time point in a month from the first time point to determine a change of facial contours.

A three-dimensional face image may be photographed automatically whenever a user uses the display device 100, or when the user inputs a command for photographing a three-dimensional face image. In either case, when a three-dimensional face image of the user is not photographed at the second time point in a month from the first time point, the display device 100 may guide photographing of a three-dimensional face image by a visual or auditory method.

Although not shown in the drawings, the display device 100 may further include an input device for receiving a user's command, and the input device may include a touch pad. The touch pad may be positioned on the front surface of the display device 100 to implement a touch screen.

As another example, when a user selects three-dimensional face images photographed at two different time points and requests information about a change of facial contours, the controller 140 may compare the selected three-dimensional face images with each other to determine a change of facial contours, and display information about the change of facial contours on the display 130.

For this, the display 130 may display an icon for enabling the user to request information about a change of facial contours, and the user may control the input device to input a request for a change of facial contours and a selection of three-dimensional face images based on which a change of facial contours is determined.

As another example, the controller 140 may compare, whenever a three-dimensional face image of a user is photographed, a three-dimensional face image of the user previously photographed with the currently photographed three-dimensional face image to determine a change of facial contours. As described above, a three-dimensional face image may be photographed automatically whenever the user uses the display device 100, or when the user inputs a command for photographing a three-dimensional face image.

Time points at which the display device 100 according to an embodiment determines a change of a facial contour are not limited to the above-described examples. Another method than the above-described examples may be applied as long as it can compare three-dimensional face images photographed at two different time points.

Figure 9:
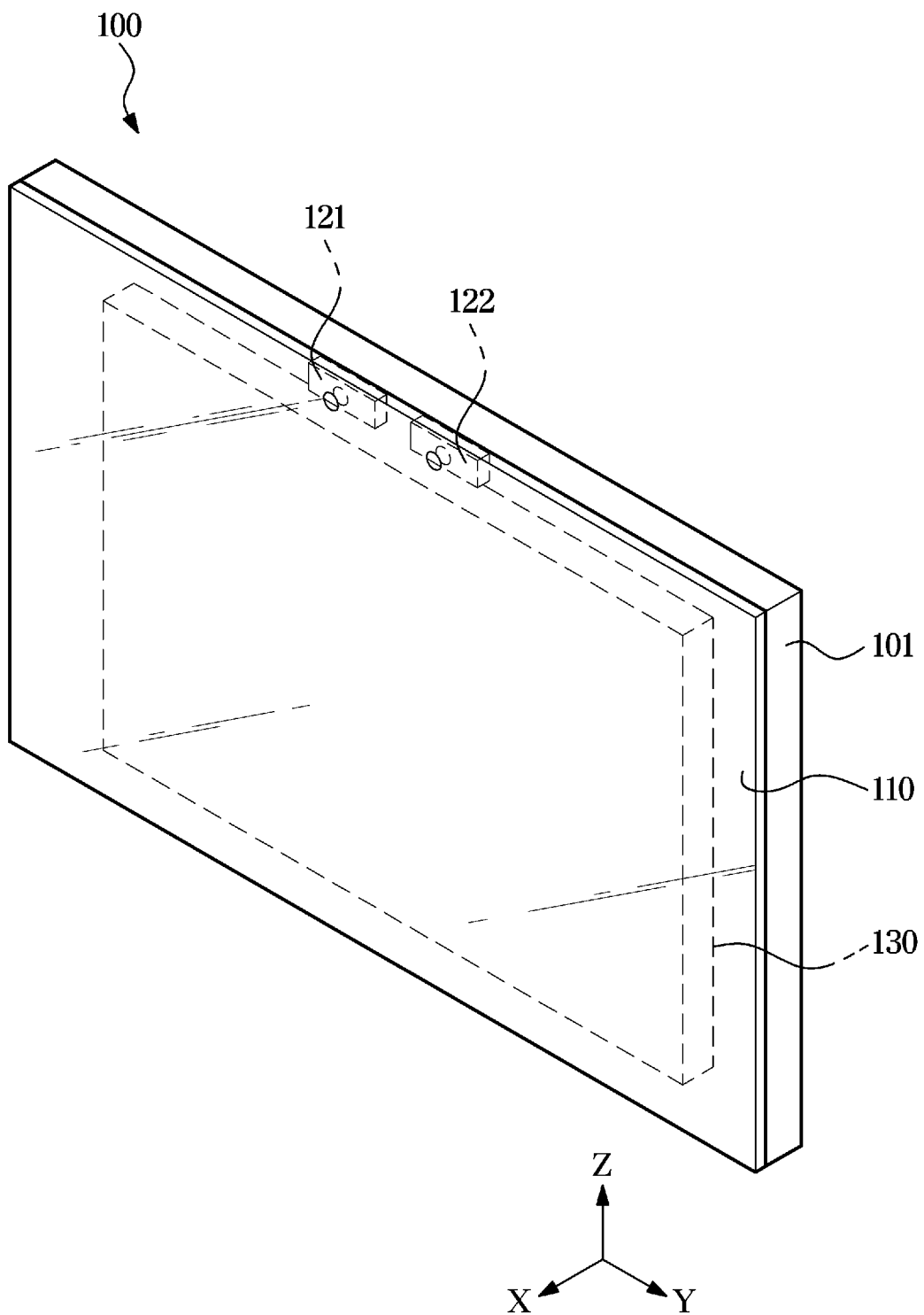
FIG. 9 is a perspective view showing an appearance of a display device further including a two-dimensional camera according to an embodiment of the disclosure.
Figure 10:
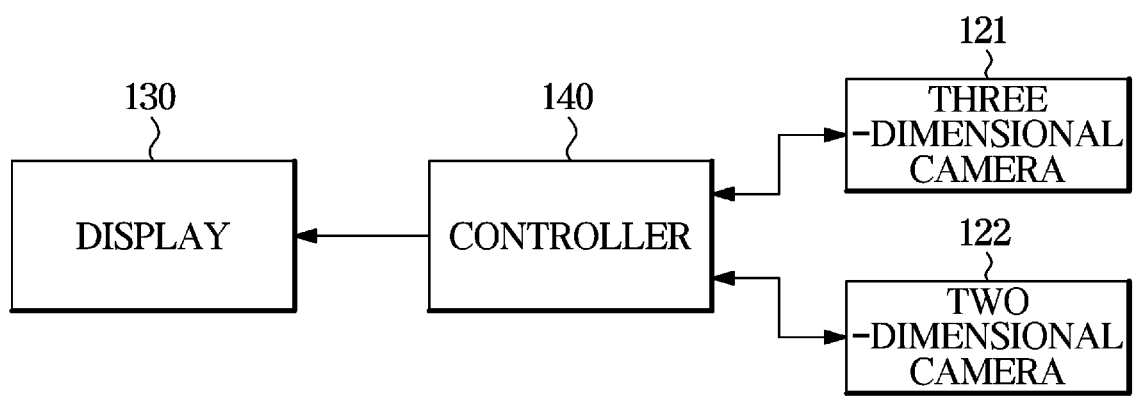
FIG. 10 is a control block diagram of a display device further including a two-dimensional camera according to an embodiment of the disclosure.

FIG. 9 is a perspective view showing an appearance of a display device further including a two-dimensional camera according to an embodiment of the disclosure, and FIG. 10 is a control block diagram of a display device further including a two-dimensional camera according to an embodiment of the disclosure.

Referring to FIGS. 9 and 10, the display device 100 may further include the two-dimensional camera 122 positioned toward the front direction. Positioning the two-dimensional camera 122 toward the front direction means that the two-dimensional camera 122 can photograph an object located in front of the display device 100.

The two-dimensional camera 122, which is a color camera including a complementary metal-oxide semiconductor (CMOS) sensor or a charge coupled device (CCD) sensor, may photograph a two-dimensional image of an object. Accordingly, the two-dimensional camera 122 may photograph a two-dimensional face image of a user located in front of the display device 100.

Figure 11:
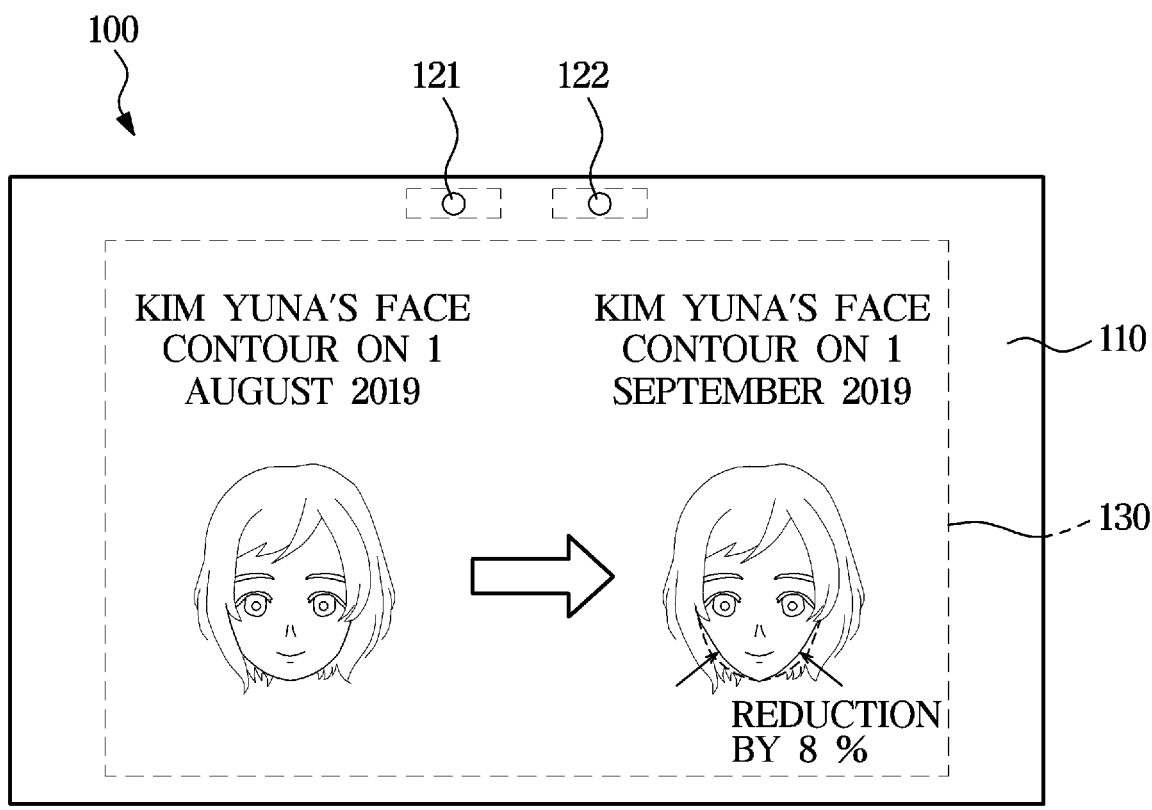
FIG. 11 shows an example of information about a change of a facial contour displayed on a two-dimensional face image in a display device according to an embodiment of the disclosure.

FIG. 11 shows an example of information about a change of a facial contour displayed on a two-dimensional face image in a display device according to an embodiment of the disclosure.

In the above-described example of FIG. 8, the display 130 may represent information about a change of a facial contour of a user with a numerical value.

Referring to FIG. 11, by schematically displaying information about a change of a facial contour on a two-dimensional face image of a user photographed by the two-dimensional camera 122, the user may more intuitively understand a change of his/her facial contour.

More specifically, a change corresponding to a change of a facial contour, determined by the controller 140, may be applied to a user's face appearing in a two-dimensional face image of the user photographed at a first time point. For example, when the user's cheek is reduced by 8%, the user's cheek appearing in the two-dimensional face image of the user photographed at the first time point may be reduced by 8%. Alternatively, the user's cheek may be reduced by a larger percentage for the user to more intuitively understand the change, and an actual reduction percentage may be represented by a numerical value to maintain the accuracy of provided information.

Figure 12:
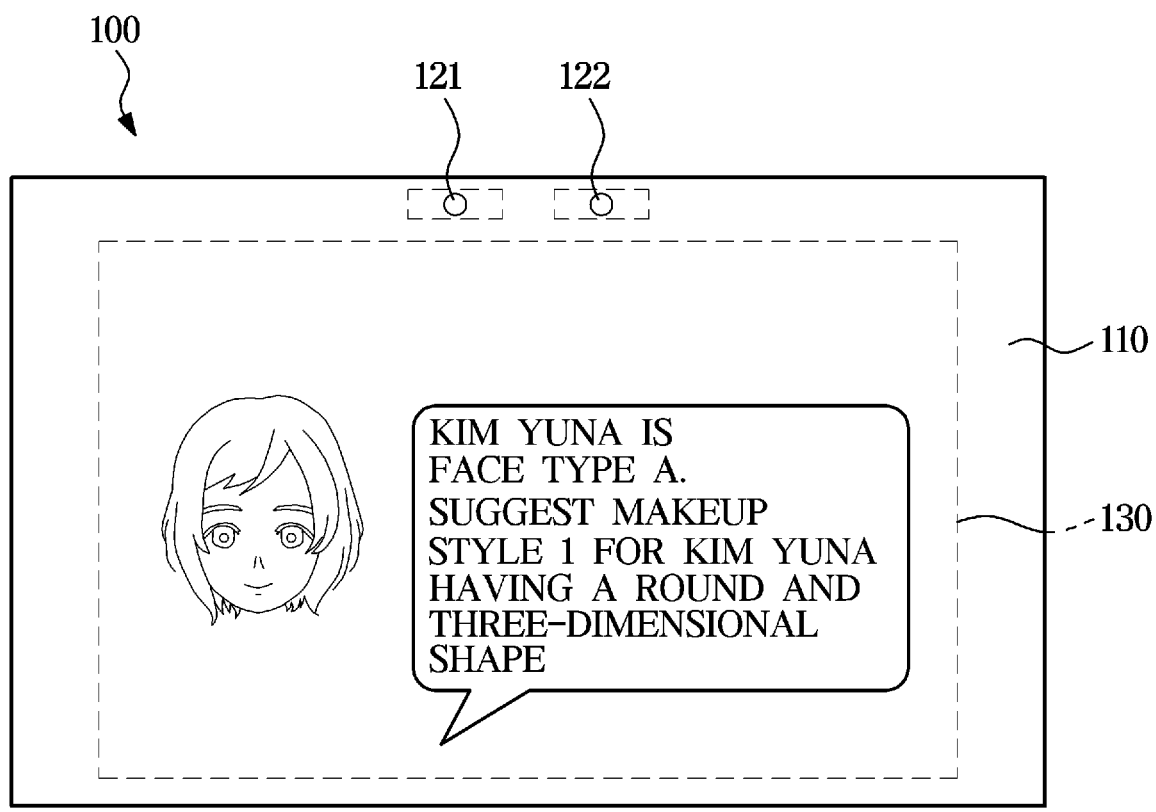
FIGS. 12 and 13 show examples of other information provided based on information about a facial contour of a user in a display device according to various embodiments of the disclosure.
Figure 13:
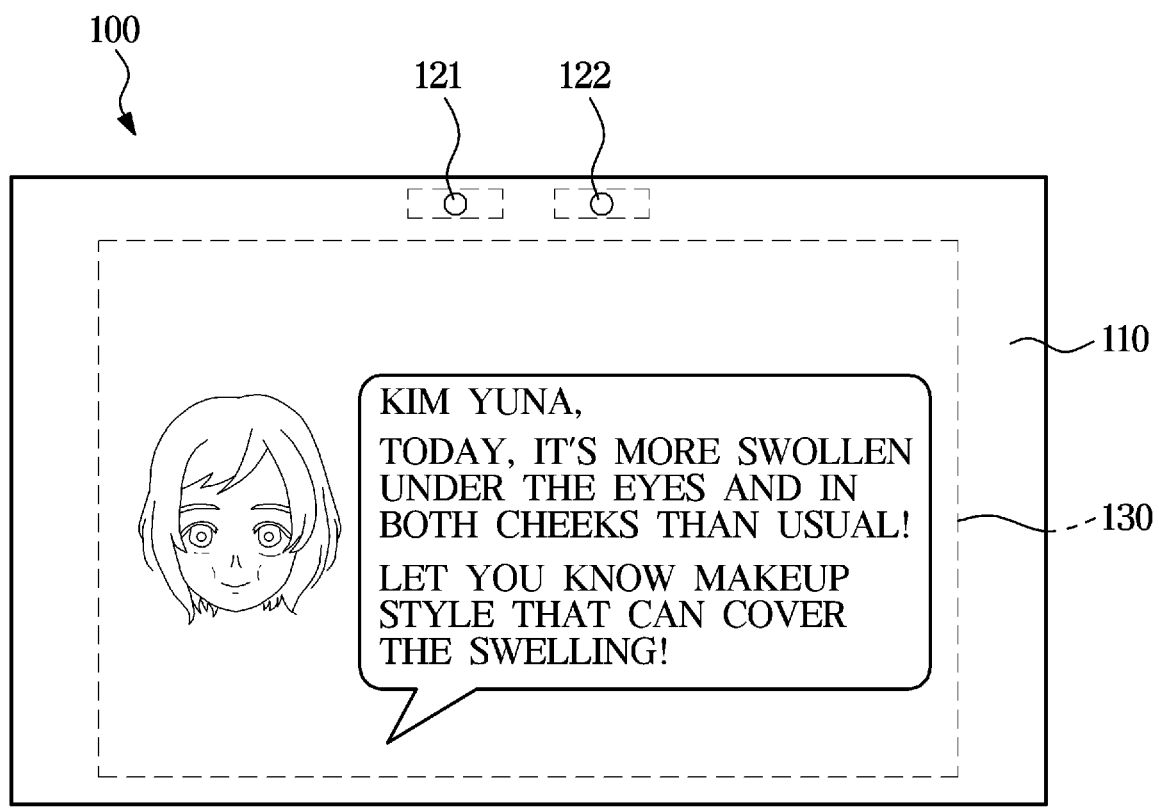

FIGS. 12 and 13 show examples of other information provided based on information about a facial contour of a user in a display device according to various embodiments of the disclosure.

The display device 100 according to an embodiment may perform various functions, by using information about a facial contour of a user, obtained through the three-dimensional camera 121.

Referring to FIG. 12, information about a makeup style based on a user's face shape may be provided. The controller 140 may determine a type of the user's face shape based on a three-dimensional face image of the user. A type of a face shape may be determined based on a two-dimensional shape seen from the front, three-dimensional information about whether the face shape is three-dimensional or flat, etc. For example, types of face shapes may include type A of a round and three-dimensional shape, type B of a long and flat shape, type C of a round and flat shape, type D of a long and three-dimensional shape, type E of an angular and three-dimensional shape, type F of an angular and flat shape, etc.

A makeup style may depend on a type of a face shape. The controller 140 may have stored information about makeup styles for individual types of users' face shapes, or the controller 140 may obtain information about a makeup style corresponding to a user's face shape from an external server through a communicator provided in the display device 100.

The controller 140 may display information about a makeup style corresponding to a type of a user's face shape on the display 130, as shown in FIG. 12.

Also, the controller 140 may determine the user's skin color based on a two-dimensional face image of the user photographed by the two-dimensional camera 122. A makeup style may also depend on a skin color. The controller 140 may have stored information about makeup styles for skin colors or for combinations of types of face shapes and skin colors, or the controller 140 may obtain information about a makeup style corresponding to a user's skin color or a combination of a type of the user's face shape and the user's skin color from an external server through the communicator provided in the display device 100.

Referring to FIG. 13, the display device 100 may provide information about a makeup style that is suitable for a change of a facial contour of a user. Herein, the change of the facial contour may be a change between two different time points, as described above, or a change between a usual facial contour of the user and a current facial contour of the user.

In the former case, as described above, information about a change of a facial contour may be displayed on the display 130, and then information about a makeup style that is suitable for the changed facial contour may be displayed.

In the latter case, the controller 140 may detect a difference of a facial contour of a user from a usual facial contour of the user based on a three-dimensional face image of the user. The usual facial contour of the user may be determined from an average value of three-dimensional face images of the user previously photographed, or determined from a three-dimensional face image photographed to determine a usual facial contour.

For example, when a current condition has more swelling under the eyes and in both cheeks than usual, the controller 140 may detect the swelling under the eyes and in both the cheeks by comparing a three-dimensional face image photographed by the three-dimensional camera 121 with information about a usual facial contour.

The controller 140 may control the display 130 to display a makeup style that can cover the swelling under the eyes and in both cheeks. Information about the makeup style may have been stored in advance in the controller 140 or may be obtained from an external server through the communicator provided in the display device 100.

As described above, the display device 100 according to an embodiment may determine a face condition of a user by using three-dimensional stereoscopic information instead of two-dimensional plane information, thereby providing the user with more accurate information and service.

Figure 14:
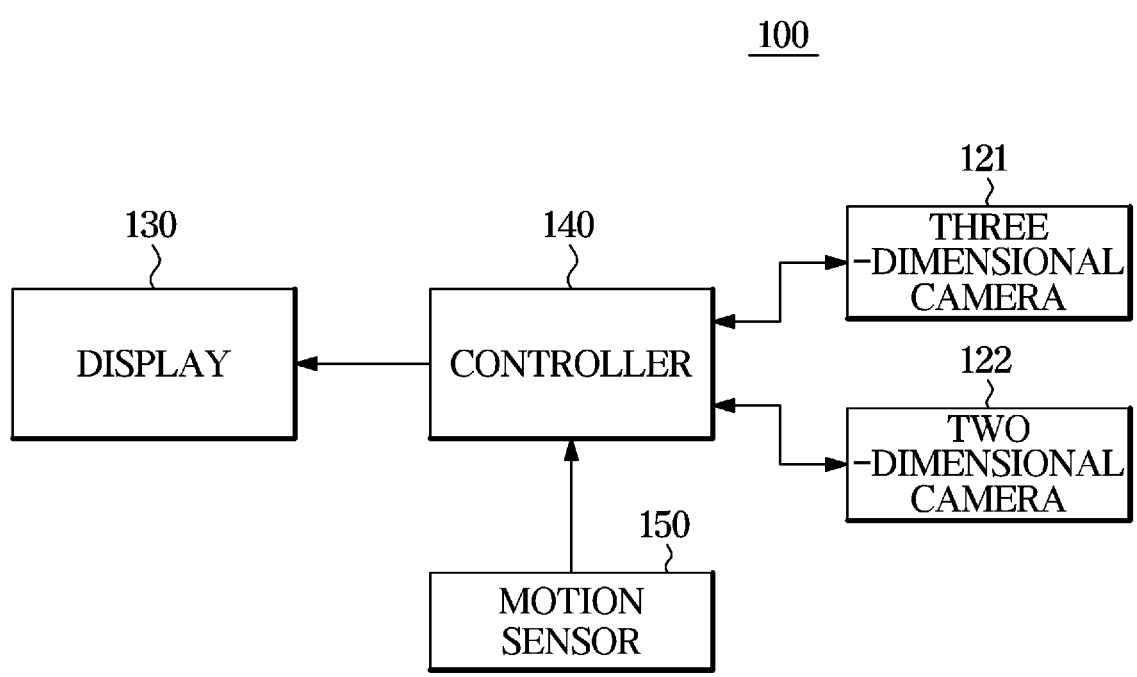
FIG. 14 is a control block diagram of another example of a display device according to an embodiment of the disclosure.
Figure 15:
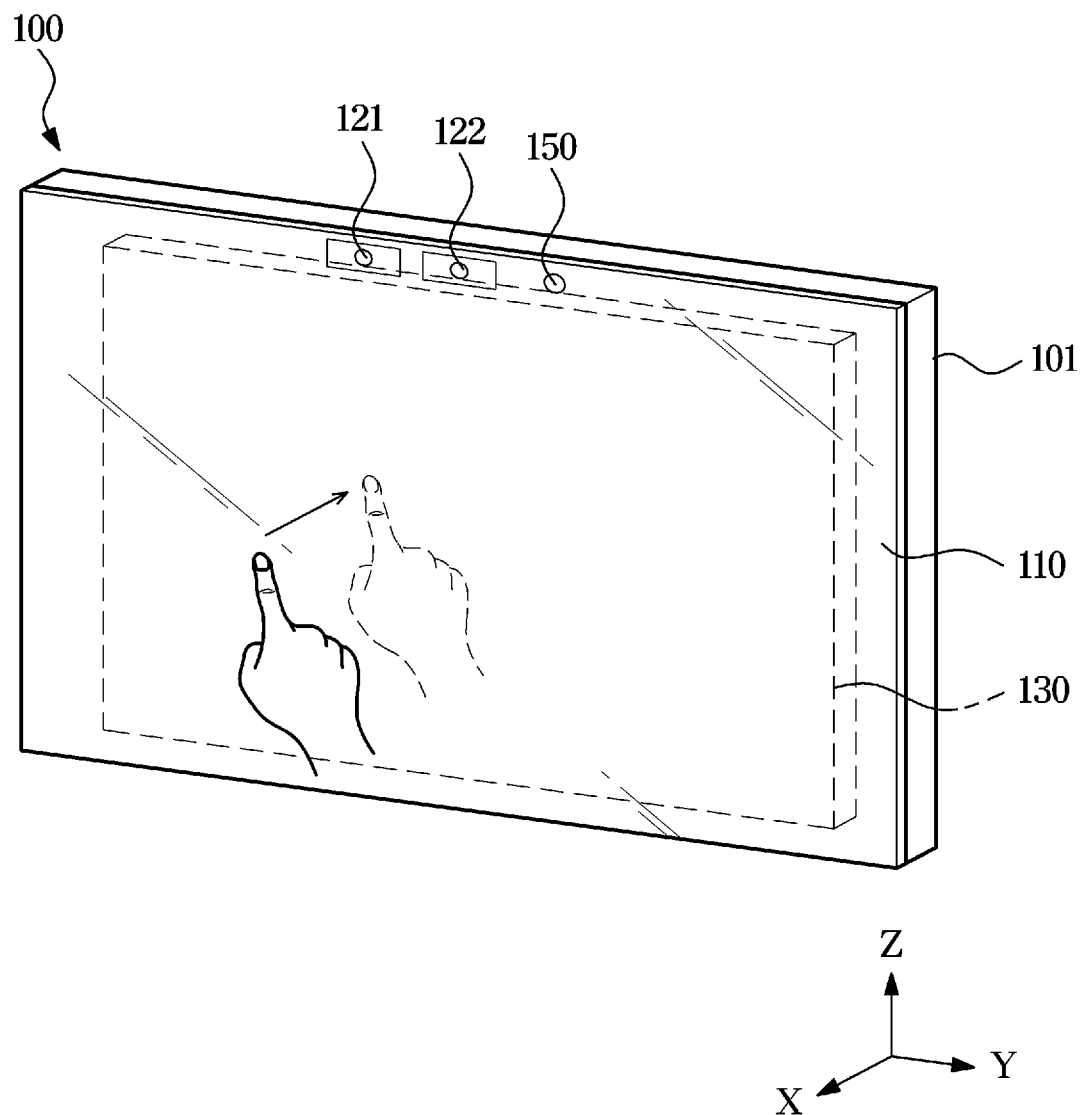
FIG. 15 shows an example in which a display device recognizes a user's gesture according to an embodiment of the disclosure.

FIG. 14 is a control block diagram of another example of a display device according to an embodiment of the disclosure, and FIG. 15 shows an example in which a display device recognizes a user's gesture according to an embodiment of the disclosure.

Referring to FIG. 14, the display device 100 according to an embodiment may further include a motion sensor 150 for sensing a user's motion.

The motion sensor 150 may adopt one of various motion sensing techniques, such as an ultrasonic sensor, an infrared sensor, a radar, etc., and the embodiment of the display device 100 does not limit a method of sensing a user's motion in the motion sensor 150.

When the motion sensor 150 senses a user's motion, the controller 140 may activate the three-dimensional camera 121, and detect a predefined gesture from a three-dimensional image photographed by the three-dimensional camera 121. Activating the three-dimensional camera 121 may mean enabling the three-dimensional camera 121 to photograph a three-dimensional image.

When the predefined gesture is detected, the controller 140 may activate the display 130. Activating the display 130 may mean converting the display 130 being in an off state into an on state or displaying a screen on the display 130. A screen displayed on the display 130 may include an image or text.

Referring to FIG. 15, when a user appears in front of the display device 100 which operates in a mirror mode upon deactivation of the display 130, the motion sensor 150 may sense the user's motion.

A result of the sensing by the motion sensor 150 may be transferred to the controller 140, and when the motion sensor 150 senses a user's motion, the controller 140 may activate the three-dimensional camera 121.

The activated three-dimensional camera 121 may photograph a three-dimensional image, and the controller 140 may detect a predefined gesture from the photographed three-dimensional image. The predefined gesture may be a gesture for activating the display 130, and for example, the predefined gesture may be, as shown in FIG. 15, a gesture of approaching a finger to the display device 100, that is, a gesture of moving a finger in a −x direction. However, the gesture may not necessarily include a motion in a depth direction, and the gesture may include a motion in a Y or Z axis direction.

Because the display device 100 according to an embodiment recognizes a user's gesture by using the three-dimensional camera 121, the display device 100 may more accurately recognize more various kinds of gestures. Particularly, the display device 100 may accurately recognize a gesture in a depth direction (X axis direction) that can be not recognized by a two-dimensional camera.

In the above-described example, a gesture defined by a finger's movement has been described. However, a gesture that is detected by the display device 100 is not limited to this. A gesture may be defined by a change in shape of a finger or hand or by another body part than a hand.

Also, various gestures for controlling other operations of the display device 100, other than a gesture for activating the display device 130, may have been defined in advance. For example, gestures corresponding to all or a part of user commands, such as deactivation of the display 130, conversion of a screen displayed on the display 130, lighting control, volume control, etc., which are input through the input device, may have been defined individually and stored in the controller 140.

The controller 140 may detect a predefined gesture by applying a gesture recognition algorithm to a three-dimensional image photographed by the three-dimensional camera 121. For example, the controller 140 may detect a hand from a three-dimensional image, and recognize a gesture constituting a pose of the detected hand or a pose and movement of the detected hand. When the recognized gesture of the hand corresponds to a predefined gesture, that is, when a predefined gesture is detected, the controller 140 may perform an operation corresponding to the predefined gesture.

When the detected gesture corresponds to activation of the display 130, the controller 140 may activate the display 130 to cause the display 130 to display a screen.

According to the above-described example, by activating the display 130 when a user's gesture for activating the display 130 is additionally detected, instead of activating the display 130 immediately when the motion sensor 150 senses the user's motion, an operation to which a user's intention is more thoroughly reflected may be performed, and the display 130 may be prevented from being necessarily activated.

Meanwhile, the two-dimensional camera 122 may be activated simultaneously with the three-dimensional camera 121, simultaneously with the display 130, or after the display 130 is activated. When the two-dimensional camera 122 is activated simultaneously with the three-dimensional camera 121, a two-dimensional color image photographed by the two-dimensional camera 122 may be used to detect a hand area by using a skin color.

When the two-dimensional camera 122 is activated simultaneously with the display 130 or after the display 130 is activated, the two-dimensional camera 122 may be activated automatically by the controller 140, activated when a user inputs a command for activating the two-dimensional camera 122, or activated according to a function that is performed by the display device 100.

For example, when the display device 100 performs a self-camera function or a function of diagnosing a user's facial contour, skin condition, etc., in a display mode, the two-dimensional camera 122 may be activated. The self-camera function, which is a function of displaying a two-dimensional image of a user photographed by the two-dimensional camera 122 on the display 120, may be a function that is similar to a mirror mode but more clearly provide a user's appearance than the half mirror 110 having a specific percentage of transmittance. Also, a user may check his/her appearance that will be seen in the eyes of other people through a two-dimensional image displayed on the display 130.

As described above, when the two-dimensional camera 122 is activated simultaneously with the display 130 or after the display 130 is activated, an invasion of a user's privacy that may occur when the two-dimensional camera 122 is always activated may be prevented.

Figure 16:
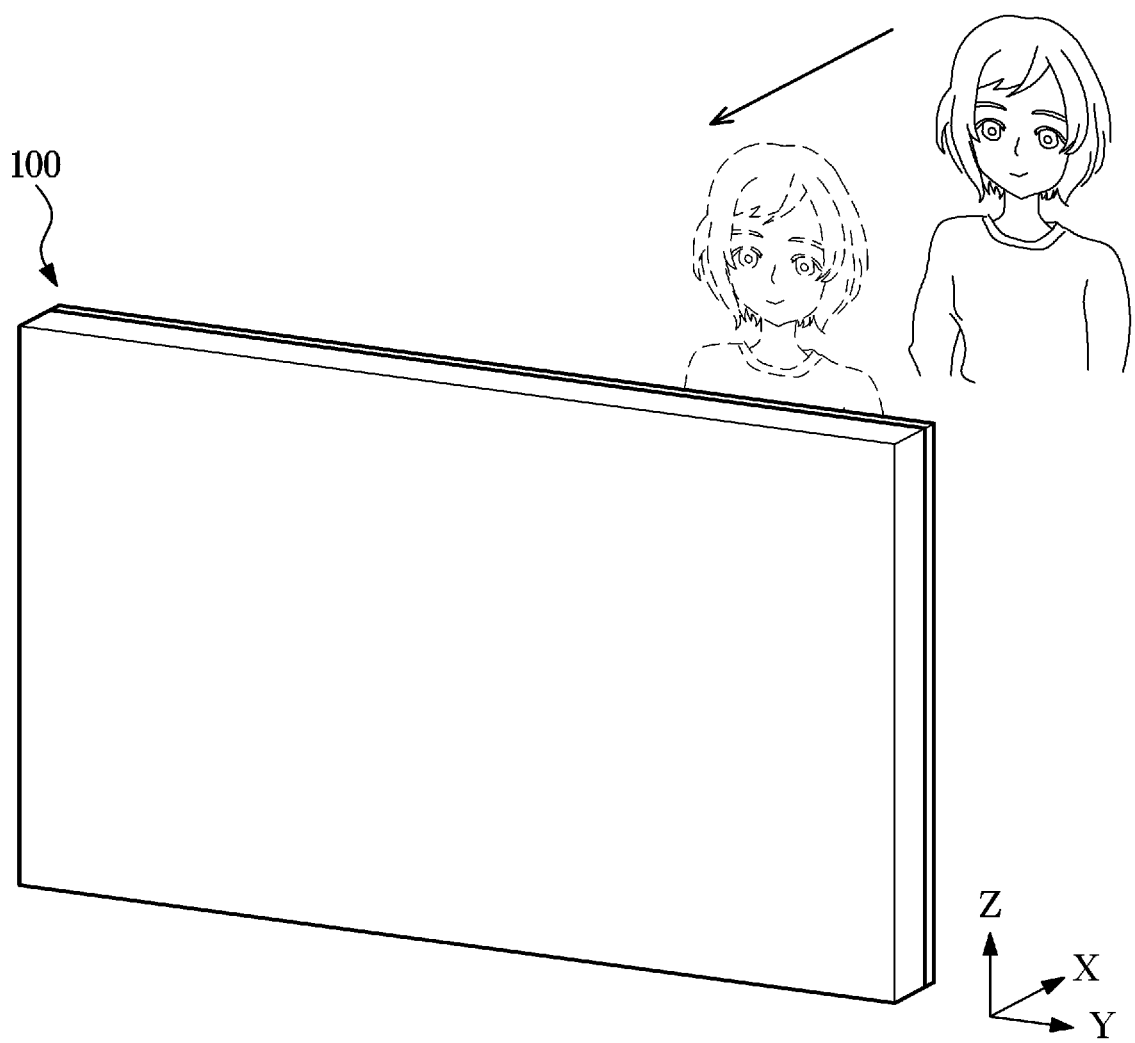
FIGS. 16, 17, and 18 show an operation in which a display device enlarges and displays a screen according to various embodiments of the disclosure.
Figure 17:
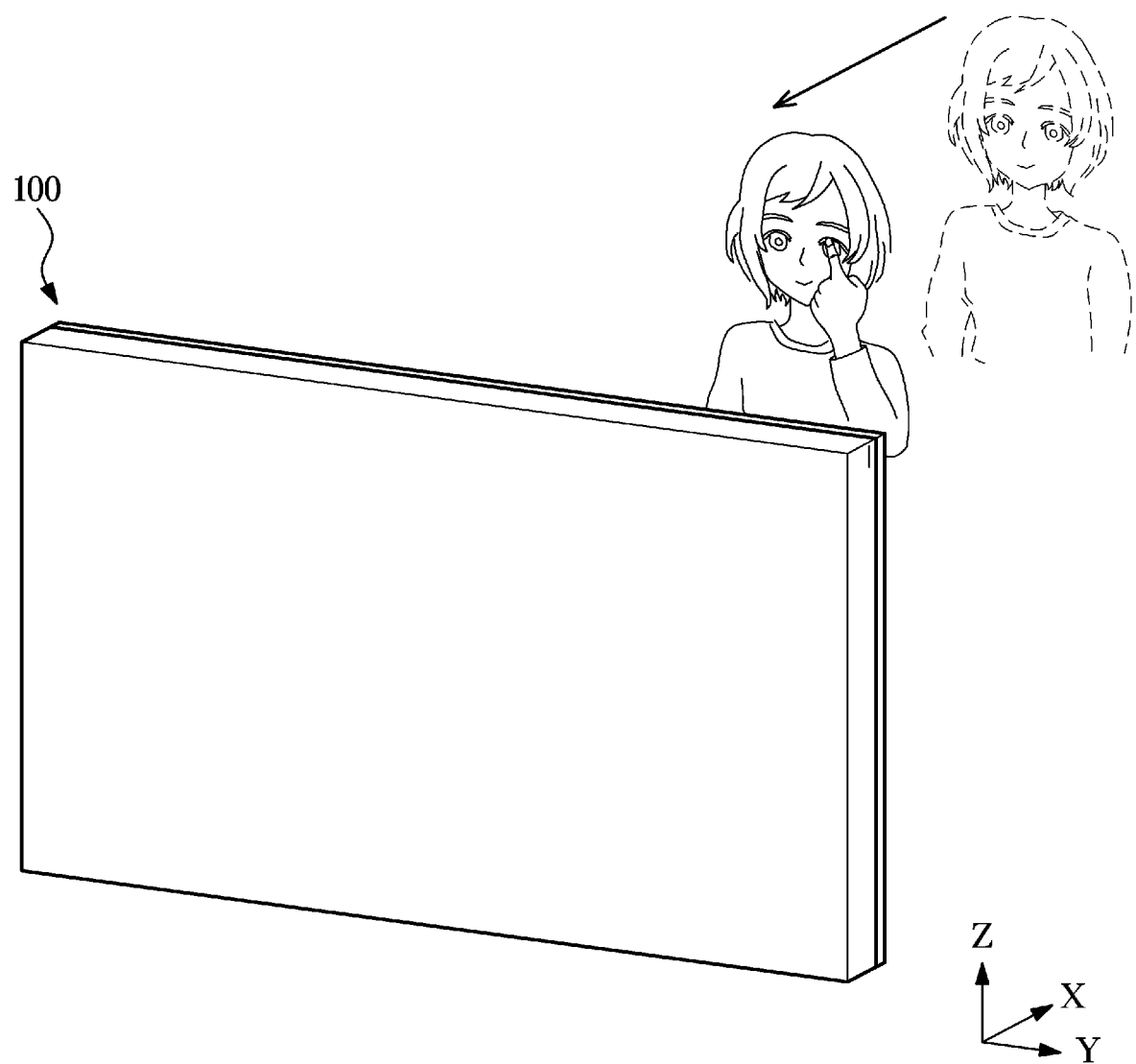
Figure 18:
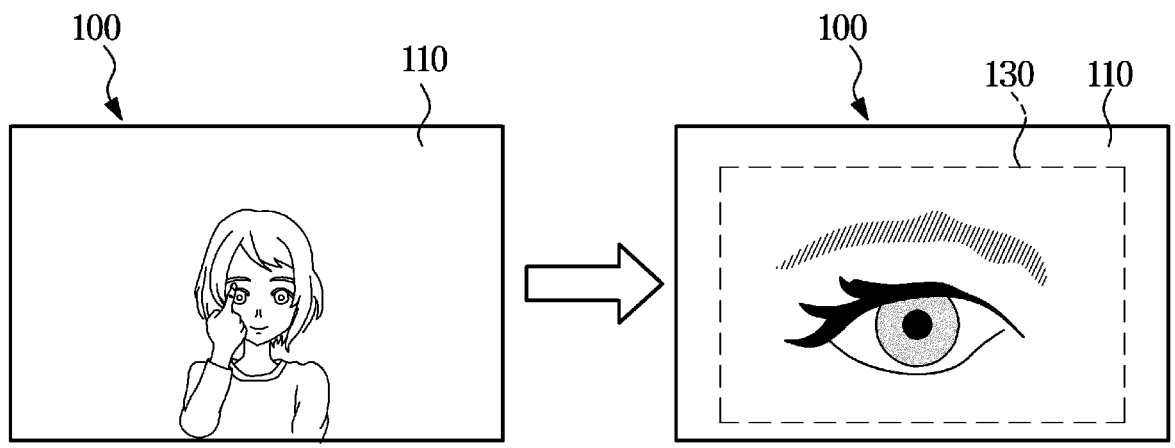

FIGS. 16 to 18 show an operation in which a display device enlarges and displays a screen according to various embodiments of the disclosure.

A case in which a user moves close to a mirror while looking into the mirror may be generally interpreted that the user intends to take a close look at a specific part. Accordingly, when a user approaches the display device 100, that is, when the user moves in a −x direction, as shown in FIG. 16, the display device 100 according to an embodiment may enlarge a two-dimensional image of the user and display the enlarged two-dimensional image.

More specifically, when the display device 100 is performing the self-camera function while operating in the display mode, and a user approaches the display device 100, the controller 140 may zoom in the two-dimensional camera 122 and display an enlarged two-dimensional image on the display 130.

For this, by activating the three-dimensional camera 121 while performing the self-camera function by using the two-dimensional camera 122, the user's approach may be detected. The controller 140 may detect the user from a three-dimensional image photographed by the three-dimensional camera 121, and determine whether the user is within a predefined reference distance in the depth direction.

When the controller 140 determines that the user is within the predefined reference distance in the depth direction in the three-dimensional image, the controller 140 may zoom in the two-dimensional camera 122 and display an enlarged two-dimensional image on the display 130.

The zoom in of the two-dimensional camera 122 may be digital zoom in or optical zoom in.

A zoom in magnification of the two-dimensional camera 122 may be determined to be a preset value, changed by a user, and determined based on a user's approach distance or a distance between a user and the display device 100.

When a zoom in magnification of the two-dimensional camera 122 is determined according to a user's approach distance, the zoom in magnification may be larger as the user's approach distance is longer (as the user moves farther toward the display device from his/her current location). When a zoom in magnification of the two-dimensional camera 122 is determined based on a distance between a user and the display device 100, the zoom in magnification may be larger as the distance between the user and the display device is shorter. As such, by more enlarging and displaying a two-dimensional image of a user as the user has a greater demand for taking a close look at his/her appearance, the user's intention may be thoroughly reflected.

Meanwhile, when a two-dimensional image of a user is enlarged and displayed, the user's desired specific part may be enlarged and displayed.

Referring to FIG. 17, when a user approaches the display device 100, the user may indicate a specific part at which he/she wants to take a close look with his/her hand, and the two-dimensional camera 122 may zoom in focusing on an area (hereinafter, referred to as a user indicating area) indicated by the user.

More specifically, as described above, the controller 140 may detect a user's approach from a three-dimensional image photographed by the three-dimensional camera 121, and, when the user's approach is detected, the controller 140 may detect a user indicating area from the three-dimensional image or a two-dimensional image.

For example, the user indicating area may be an area indicated by the user's finger in a body part including the user's face.

After the controller 140 detects the user indicating area, the controller 140 may transmit a control signal to the two-dimensional camera 122 to cause the two-dimensional camera 122 to zoom in the detected user indicating area and photograph the user indicating area.

Referring to FIGS. 17 and 18, when a user approaches the display device 100 while indicating his/her eyebrow with his/her finger, the controller 140 may detect a user's approach and a user indicating area (eyebrow) based on a three-dimensional image or based on a three-dimensional image and a two-dimensional image.

The controller 140 may control the two-dimensional camera 122 to enlarge and photograph the user's eyebrow, and a two-dimensional image enlarged and photographed by the two-dimensional camera 122 may be displayed on the display 130.

Meanwhile, to enlarge and display a two-dimensional image of a user, a zoom in function of the two-dimensional camera 122 may be used, as described above. Also, a two-dimensional image may be photographed without zooming in, that is, without changing a magnification, and then when the two-dimensional image is displayed on the display 130, a user indicating area may be enlarged and displayed.

As described above, by detecting a user's approach and enlarging and showing the user's desired part, the user's larger and clearer appearance may be provided than when the user is reflected in a mirror.

Figure 19:
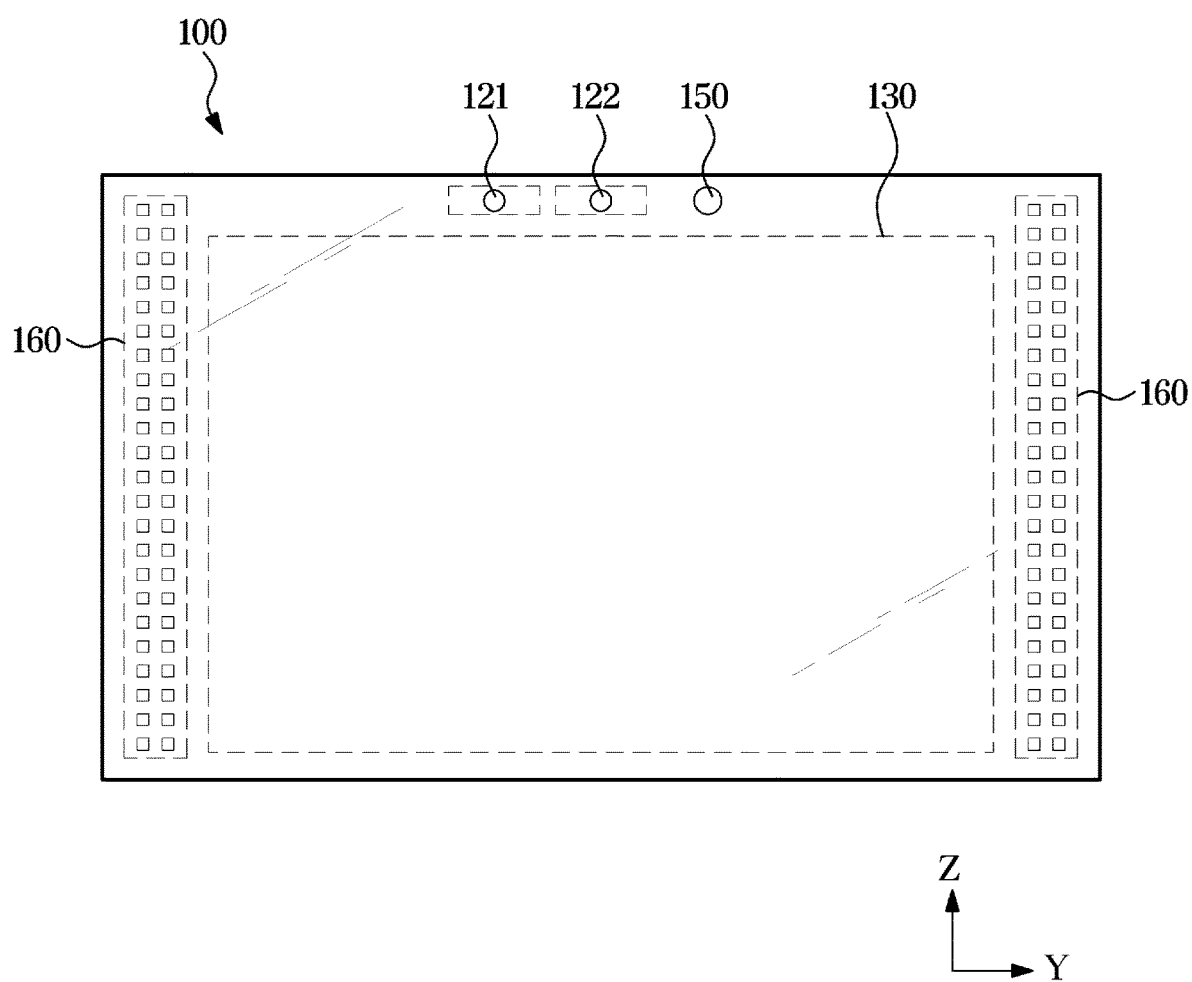
FIG. 19 is an appearance view of a display device further including a light according to an embodiment of the disclosure.
Figure 20:
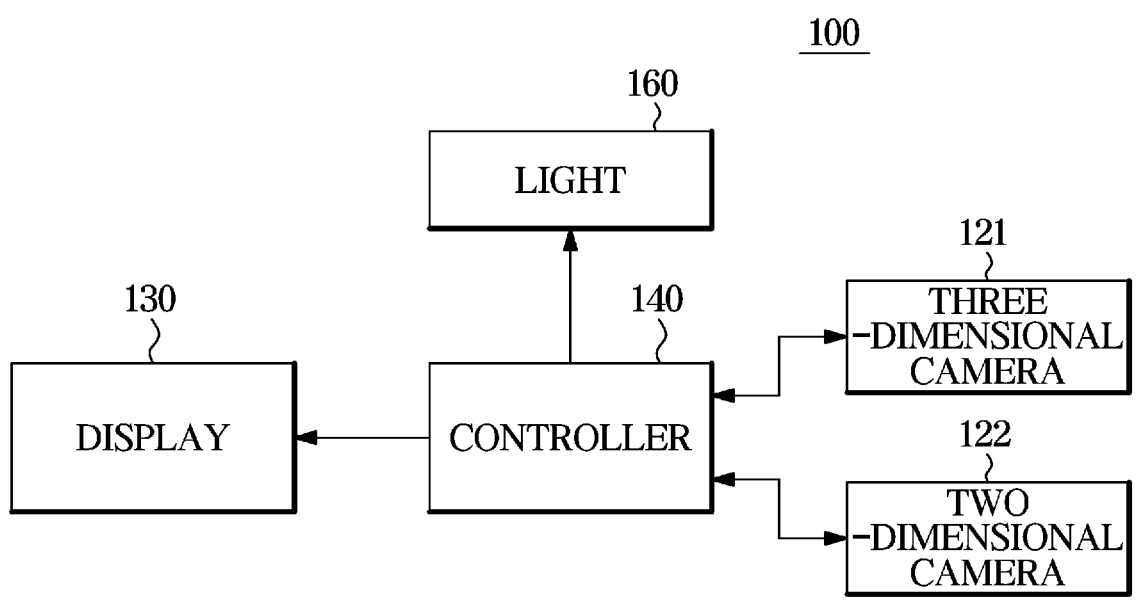
FIG. 20 is a control block diagram of a display device further including a light according to an embodiment of the disclosure.

FIG. 19 is an appearance view of a display device further including a light according to an embodiment of the disclosure, and FIG. 20 is a control block diagram of a display device further including a light according to an embodiment of the disclosure.

Referring to FIGS. 19 and 20, the display device 100 according to an embodiment may further include a light 160. For example, the light 160 may include a plurality of light emitting diode (LED) devices, and at least one of the brightness and color of the light 160 may be controlled by the controller 140.

For example, when a user approaches the display device 100, the controller 140 may control the brightness of the light 160 based on the user's approach distance or a distance between the user and the display device 100. At this time, the display 130 may enlarge and display a three-dimensional image of the user, as described above.

As the user's approach distance is longer (as the user moves farther toward the display device from his/her current location) or as the distance between the user and the display device 100 is shorter, the controller 140 may control the light 160 to emit brighter light by reflecting the user's intention that wants to take a closer look at his/her appearance. Because excessive brightness of the light 160 may cause dazzling, the controller 140 may control the light 160 to optimal brightness that enables the user to check his/her appearance in detail without causing dazzling, based on a distance between the user and the display device 100.

Hereinafter, a control method of a display device, according to an embodiment, will be described. To perform the control method of the display device according to an embodiment, the display device 100 described above may be used. Accordingly, content described above with reference to FIGS. 1 to 20 may be applied in the same way to embodiments about the control method of the display device, unless otherwise stated.

Figure 21:
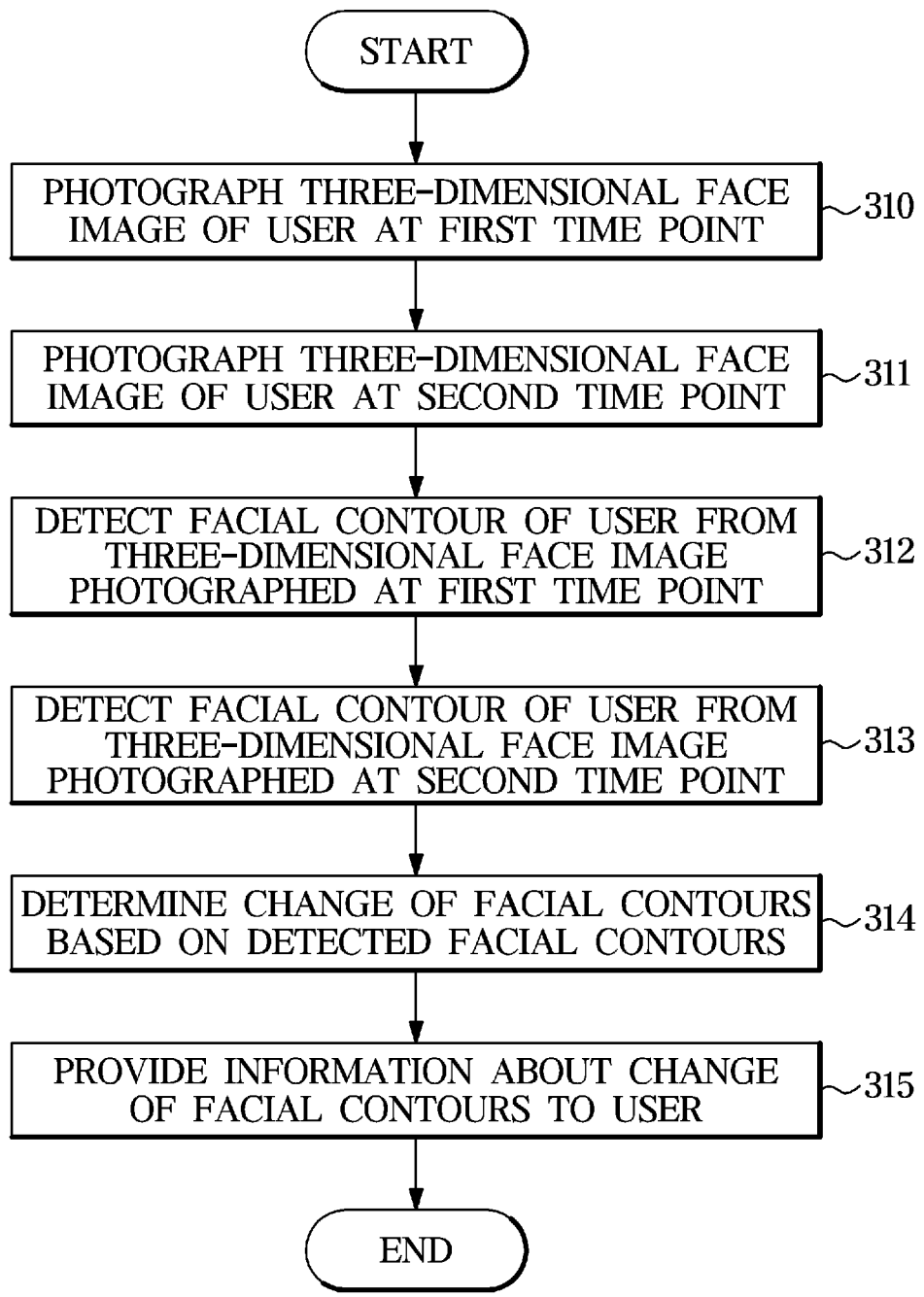
FIG. 21 is a flowchart illustrating a control method of a display device according to an embodiment of the disclosure.

FIG. 21 is a flowchart illustrating a control method of a display device according to an embodiment of the disclosure.

Referring to FIG. 21, the control method of the display device, according to an embodiment, may photograph a three-dimensional face image of a user at a first time point in operation 310, and photograph a three-dimensional face image of the user at a second time point in operation 311.

The first time point and the second time point may be two different time points, and may be different dates or different times on the same date. Details about times at which the three-dimensional face images of the user are photographed have been described above in the embodiment of the display device 100.

The three-dimensional face images may be photographed by the three-dimensional camera 121 provided in the display device 100.

A facial contour of the user may be detected from the three-dimensional face image photographed at the first time point in operation 312, and a facial contour of the user may be detected from the three-dimensional face image photographed at the second time point in operation 313.

Detection of facial contours may be performed by applying an image processing technique, such as a face recognition algorithm or an edge detection algorithm, to the three-dimensional face images in the controller 140.

A change of the facial contours may be determined based on the detected facial contours in operation 314. For example, a change of the facial contours may include at least one of a change in volume of the entire face and a change in volume of a specific part. The specific part may include at least one of all parts, such as cheek, cheekbone, chin, under the eyes, eyelids, etc., of which volumes may change due to a cause, such as swelling, a weight change, etc. The determination on the change of the facial contours may also be performed by the controller 140.

Information about the change of the facial contours may be provided to the user in operation 315. The information about the change of the facial contours may be visually displayed on the display 130. For example, the information about the change of the facial contours may be displayed by a numerical value, as shown in FIG. 8 described above. Alternatively, as shown in FIG. 11 described above, by schematically displaying information about a change of facial contours on a two-dimensional face image of a user photographed by the two-dimensional camera 122, the user may more intuitively understand a change of facial contours. For example, a change corresponding to a change of facial contours, determined by the controller 140, may be applied to a user's face appearing in a two-dimensional face image of the user photographed at a first time point.

Meanwhile, at least one piece of a three-dimensional face image and information about a change of a facial contour may be stored for each user. For the controller 140 to store and manage at least one of a three-dimensional face image and information about a change of a facial contour for each user, the controller 140 may recognize a user, and user recognition may be performed based on a user input or automatically.

When a user is recognized based on a user input, the user may input information such as his/her ID or name based on which the user can be identified, to an input device provided in the display device 100, and a three-dimensional face image of the user or information about a change of a facial contour of the user may match with the information based on which the user can be identified and be stored.

When a user is recognized automatically, the controller 140 may recognize the user based on a two-dimensional face image of the user photographed by the two-dimensional camera 122 or a three-dimensional face image of the user photographed by the three-dimensional camera 121. At this time, the controller 140 may apply a face recognition algorithm to the two-dimensional face image or the three-dimensional face image.

After the controller 140 recognizes the user based on a two-dimensional face image or a three-dimensional face image of the user, the controller 140 may search a three-dimensional face image stored for the recognized user, compare a current three-dimensional face image of the user photographed by the three-dimensional camera 121 with the stored three-dimensional face image, and determine a change of a facial contour.

The control method of the display device, according to an embodiment, may perform various functions by using information about a facial contour of a user, obtained by the three-dimensional camera 121, in addition to providing information about a change of a facial contour as described above.

For example, the controller 140 may determine a type of a user's face shape based on a facial contour detected from a three-dimensional face image of the user, and control the display 130, and provide information about a makeup style corresponding to the determined type of the user's face shape.

As another example, the controller 140 may control the display 130 to provide information about a makeup style corresponding to a change of a facial contour of a user. Herein, the change of the facial contour of the user may be a change between a current time point and a specific time point, as described above, or a change between the user's usual facial contour and the user's current facial contour.

Figure 22:
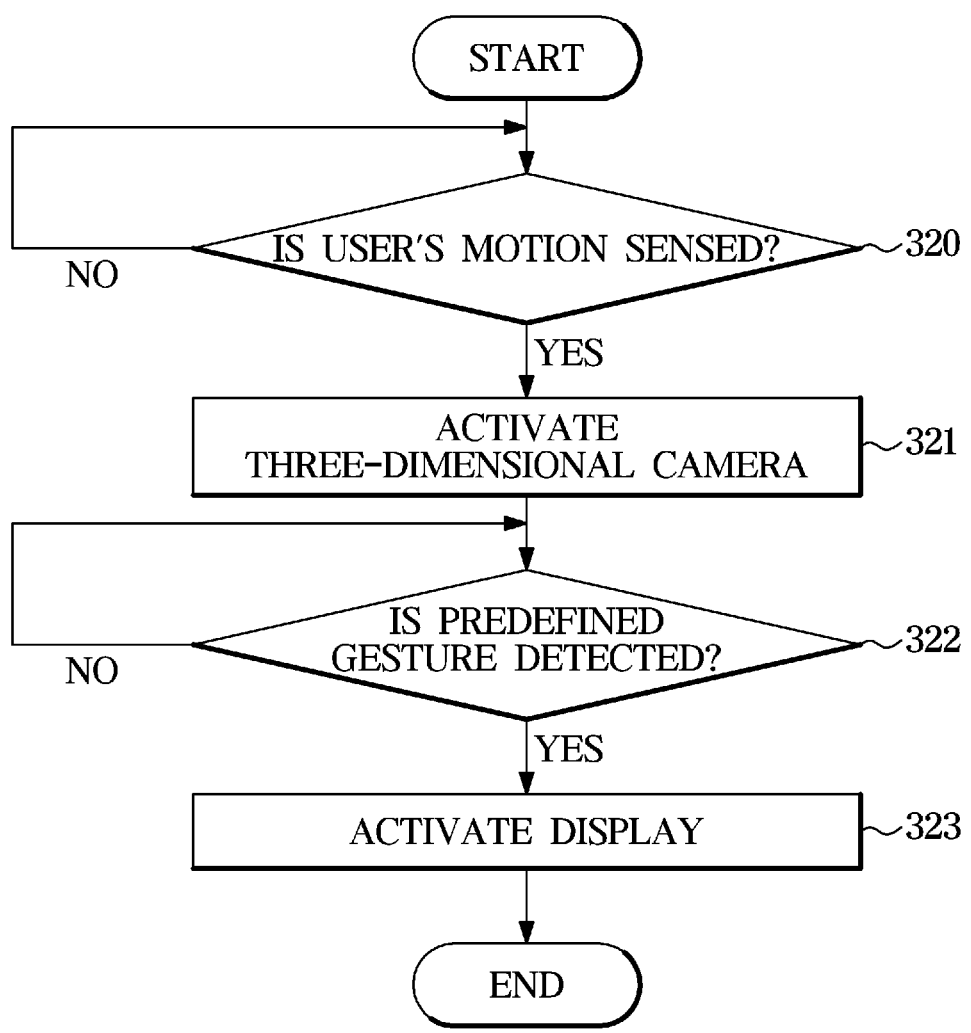
FIG. 22 is another flowchart illustrating a control method of a display device according to an embodiment of the disclosure.

FIG. 22 is another flowchart illustrating a control method of a display device according to an embodiment of the disclosure.

Referring to FIG. 22, when the motion sensor 150 senses a user's motion (YES in operation 320), the controller 140 may activate the three-dimensional camera 121 in operation 321. The activated three-dimensional camera 121 may photograph a three-dimensional image.

The controller 140 may detect a predefined gesture from the three-dimensional image photographed by the three-dimensional camera 121. When the predefined gesture is detected (YES in operation 322), the controller 140 may activate the display 130 in operation 323.

Meanwhile, the two-dimensional camera 122 may be activated simultaneously with the three-dimensional camera 121, simultaneously with the display 130, or after the display 130 is activated. When the two-dimensional camera 122 is activated simultaneously with the three-dimensional camera 121, a two-dimensional color image photographed by the two-dimensional camera 122 may be used to detect a hand area by using a skin color.

When the two-dimensional camera 122 is activated simultaneously with the display 130 or after the display 130 is activated, the two-dimensional camera 122 may be activated automatically by the controller 140, activated when a user inputs a command for activating the two-dimensional camera 122, or activated according to a function that is performed by the display device 100.

For example, when the display device 100 performs a self-camera function or a function of diagnosing a facial contour, skin condition, etc., of a user in a display mode, the two-dimensional camera 122 may be activated. The self-camera function, which is a function of displaying a user's two-dimensional image photographed by the two-dimensional camera 122 on the display 130, may be a function that is similar to a mirror mode, but more clearly provide a user's appearance than the half mirror 110 having a specific percentage of transmittance. Also, a user may check his/her appearance seen in the eyes of other people through a two-dimensional image displayed on the display 130.

As described above, when the two-dimensional camera 122 is activated simultaneously with the display 130 or after the display 130 is activated, an invasion of a user's privacy that may occur when the two-dimensional camera 122 is always activated may be prevented.

Figure 23:
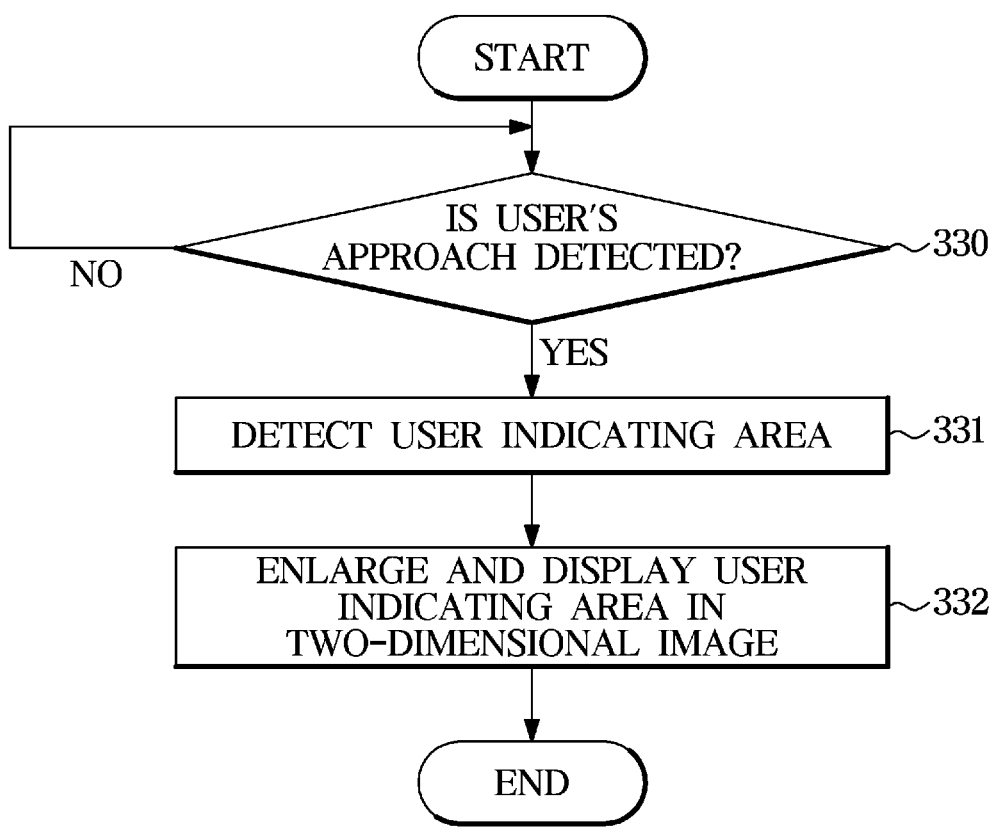
FIG. 23 is another flowchart illustrating a control method of a display device according to an embodiment of the disclosure.

FIG. 23 is another flowchart illustrating a control method of a display device according to an embodiment of the disclosure.

Referring to FIG. 23, according to the control method of the display device, when the controller 140 detects a user's approach (YES in operation 330), the controller 140 may detect a user indicating area in operation 331, and enlarge and display the user indicating area in a two-dimensional image in operation 332.

For example, when the display device 100 is performing the self-camera function while operating in the display mode, the display device 100 may activate the three-dimensional camera 121 while performing the self-camera function by using the two-dimensional camera 122, to detect a user's approach. The controller 140 may detect the user from a three-dimensional image photographed by the three-dimensional camera 121, and determine whether the user is within a predefined reference distance in a depth direction.

When the user's approach is detected, the controller 140 may detect a user indicating area from the three-dimensional image or the two-dimensional image. For example, the user indicating area may be an area indicated by the user's finger in a body part including the user's face.

After the controller 140 detects the user indicating area, the controller 140 may transmit a control signal to the two-dimensional camera 122 to cause the two-dimensional camera 122 to zoom in the detected user indicating area and photograph the user indicating area. The zoomed-in and photographed two-dimensional image may be displayed on the display 130. Alternatively, a two-dimensional image may be photographed without zooming in, that is, without changing a magnification, and then when the two-dimensional image is displayed on the display 130, a user indicating area may be enlarged and displayed.

Also, the control method of the display device, according to an embodiment, may control, when a user approaches the display device 100, the brightness of the light 160 based on the user's approach distance or a distance between the user and the display device 100.

As the user's approach distance is longer (as the user moves farther toward the display device from his/her current location) or as the distance between the user and the display device 100 is shorter, the controller 140 may control the light 160 to emit brighter light by reflecting the user's intention that wants to take a closer look at his/her appearance. Because excessive brightness of the light 160 may cause dazzling, the controller 140 may control the light 160 to optimal brightness that enables the user to check his/her appearance in detail without causing dazzling, based on a distance between the user and the display device 100.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A display device comprising:
    a mirror display;
    a three-dimensional camera disposed toward a front direction of the mirror display;
    a motion sensor configured to sense a motion of a user; and
    a controller configured to:
        detect facial contours of a user from three-dimensional face images of the user that were photographed at least two different time points by the three-dimensional camera,
        identify a change of the facial contours between the at least two different time points based on the detected facial contours,
        control the mirror display to display information about the change of the facial contours,
        activate the three-dimensional camera when the motion sensor detects the motion of the user,
        detect a predefined gesture from a three-dimensional image photographed by the three-dimensional camera, and
        activate the mirror display when the predefined gesture is detected.

2. The display device of claim 1, wherein the controller is further configured to control the mirror display to display the information about the change of the facial contours by a numerical value.

3. The display device of claim 1, further comprising:
    a two-dimensional camera positioned toward the front direction of the mirror display,
    wherein the controller is further configured to control the mirror display to display the information about the change of the facial contours on a two-dimensional face image of the user photographed by the two-dimensional camera.

4. The display device of claim 3, wherein the controller is further configured to store at least one of the three-dimensional face images or the information about the change of the facial contours for each user.

5. The display device of claim 4, wherein the controller is further configured to recognize the user based on the two-dimensional face image of the user photographed by the two-dimensional camera or the three-dimensional face images of the user photographed by the three-dimensional camera.

6. The display device of claim 5, wherein the controller is further configured to identify the change of the facial contours based on a three-dimensional face image previously stored for the recognized user and a current three-dimensional face image of the user photographed by the three-dimensional camera.

7. The display device of claim 3, wherein the controller is further configured to activate the two-dimensional camera in response to detecting a predefined gesture.

8. The display device of claim 3, wherein the controller is further configured to:
    detect a user indicating area from a two-dimensional image photographed by the two-dimensional camera or one of the three-dimensional face images photographed by the three-dimensional camera, and
    control the two-dimensional camera to zoom in the detected user indicating area and photograph the user indicating area.

9. The display device of claim 1, wherein the controller is further configured to:
    determine a face shape type of the user based on the detected facial contours, and
    control the mirror display to provide information about a makeup style corresponding to the determined face shape type of the user.

10. The display device of claim 1, wherein the controller is further configured to control the mirror display to provide information about a makeup style corresponding to the change of the facial contours.

11. The display device of claim 1, wherein the mirror display comprises:
    a half mirror positioned on a front surface of the display device, and
    a display positioned behind the half mirror.

12. The display device of claim 1, wherein the mirror display comprises a display comprising an upper polarizing plate on which a mirror film is disposed.

13. The display device of claim 1, further comprising:
    a light positioned toward the front direction,
    wherein the controller is further configured to control brightness of the light based on a three-dimensional image photographed by the three-dimensional camera.

14. The display device of claim 13, wherein the controller is further configured to:
    detect approach of the user based on the three-dimensional image, and
    control the light to emit brighter light in response to detecting the user's approach.

15. The display device of claim 13, wherein the controller is further configured to:
    determine a distance between the user and the display device based on the three-dimensional image, and
    control brightness of the light based on the determined distance.

16. A method of controlling a display device, the display device comprising a mirror display, a motion sensor configured to sense a motion of a user, a two-dimensional camera, and a three-dimensional camera, the method comprising:
    photographing a three-dimensional face image of a user at a first time point by using the three-dimensional camera;
    photographing a three-dimensional face image of the user at a second time point by using the three-dimensional camera;

detecting a facial contour of the user from the three-dimensional face image of the user photographed at the first time point;

detecting a facial contour of the user from the three-dimensional face image of the user photographed at the second time point;

identifying a change of the facial contours between the first time point and the second time point based on the detected facial contours;

displaying information about the change of the facial contours on the mirror displays;

activating the three-dimensional camera when the motion sensor detects the motion of the user;

detecting a predefined gesture from a three-dimensional image photographed by the three-dimensional camera; and activating the mirror display when the predefined gesture is detected.

17. The method of claim 16, wherein the displaying of the information about the change of the facial contours on the mirror display comprises displaying the information about the change of the facial contours by a numerical value.

18. The method of claim 16, wherein the displaying of the information about the change of the facial contours on the mirror display comprises:

displaying the information about the change of the facial contours on a two-dimensional face image of the user photographed by the two-dimensional camera.

19. The method of claim 18, further comprising:

storing at least one of the three-dimensional face images photographed at the first time point and the second time point or the information about the change of the facial contours for each user.

20. The method of claim 19, further comprising:

recognizing the user based on the two-dimensional face image of the user photographed by the two-dimensional camera or the three-dimensional face images of the user photographed by the three-dimensional camera, wherein the identifying of the change of the facial contours between the first time point and the second time point comprises determining the change of the facial contours based on the three-dimensional face image stored for the recognized user and photographed at the first time point and the three-dimensional face image of the user photographed at the second time point by the three-dimensional camera.

* * * * *